(12) United States Patent
Flora et al.

(10) Patent No.: US 7,412,817 B2
(45) Date of Patent: Aug. 19, 2008

(54) METHOD FOR RETRIEVING AND PROCESSING BULK HARVESTED NUTS AND FRUITS

(76) Inventors: Jonathan J. Flora, 5143 Blue Gum Ave., Modesto, CA (US) 95358; Douglas W. Flora, 5151 Blue Gum Ave., Modesto, CA (US) 98358; Adam L. Benedict, 5004 Aylesbury Way, Salida, CA (US) 95368; Pierre J. de Wet, 21073 CR 113, Tyler, TX (US) 75703

( * ) Notice: Subject to any disclaimer, the term of this patent is extended or adjusted under 35 U.S.C. 154(b) by 0 days.

(21) Appl. No.: 11/517,952

(22) Filed: Sep. 8, 2006

(65) Prior Publication Data

US 2007/0066368 A1 Mar. 22, 2007

Related U.S. Application Data

(62) Division of application No. 11/055,554, filed on Feb. 9, 2005, now Pat. No. 7,131,254.

(60) Provisional application No. 60/545,349, filed on Feb. 9, 2004.

(51) Int. Cl.
A01D 46/00 (2006.01)
(52) U.S. Cl. .................................. 56/328.1
(58) Field of Classification Search ............... 56/328.1, 56/13.1, 12.9, 12.8, 14.6, 126; 171/17, 41; 209/680, 139.1, 147
See application file for complete search history.

(56) References Cited

U.S. PATENT DOCUMENTS

| | | | |
|---|---|---|---|
| 2,943,430 A * | 7/1960 | Carruthers | 56/1 |
| 3,176,737 A | 4/1965 | Swaw | 99/570 |
| 3,227,276 A | 1/1966 | Leighton et al. | 209/139.1 |
| 3,309,851 A | 3/1967 | Logan | 56/10.3 |
| 3,593,720 A | 7/1971 | Botterill et al. | 460/1 |
| 3,775,953 A * | 12/1973 | Poutsma | 56/126 |
| 4,194,346 A * | 3/1980 | Ingalls | 56/328.1 |
| 4,287,707 A | 9/1981 | Persoons et al. | 56/12.8 |
| 4,364,222 A * | 12/1982 | Ramacher | 56/328.1 |
| 4,416,334 A | 11/1983 | Bouillion | 171/27 |
| 4,426,826 A | 1/1984 | Wesselmann | 56/13.3 |
| 4,642,977 A * | 2/1987 | Ramacher | 56/328.1 |
| 4,730,444 A * | 3/1988 | Leffel et al. | 56/13.1 |
| 5,001,893 A | 3/1991 | Stanley et al. | 56/328.1 |
| 5,024,278 A * | 6/1991 | Shuknecht | 171/17 |
| 5,373,688 A | 12/1994 | Stanley et al. | 56/328.1 |
| 5,421,147 A | 6/1995 | Holden et al. | 56/328.1 |

* cited by examiner

Primary Examiner—Árpád Fábián-Kovács
(74) Attorney, Agent, or Firm—Stratton Ballew PLLC

(57) ABSTRACT

An apparatus for processing nuts and fruits, and more specifically, to a mobile apparatus that picks-up fruits and nuts, and similar products from the ground and conditions them, in bulk. The mobile apparatus conditions the fruits and nuts by removing debris with a combination of a belted conveyor and a high volume fan. The plenum of the apparatus is sized to achieve a constant velocity of air throughout the portions of the plenum in contact with the product, providing a constant suction to prevent the entrainment of product into the dust collection system. The processing apparatus can be utilized in a conditioner that picks-up and processes the product and then returns the cleaned and conditioned product to the floor of the orchard or grove. The processing apparatus can also be utilized in a harvester that picks-up and processes the product and then stores the product temporarily in a bin.

8 Claims, 34 Drawing Sheets

METHOD FOR RETRIEVING AND PROCESSING BULK HARVESTED NUTS AND FRUITS

CROSS REFERENCE TO RELATED APPLICATIONS

This application is a divisional from U.S. Non-Provisional application Ser. No. 11/055,554, filed on Feb. 9, 2005, also claiming the benefit of now abandoned U.S. Provisional Application Ser. No. 60/545,349, filed Feb. 9, 2004, and incorporates these prior applications by reference.

TECHNICAL FIELD

The invention relates to an apparatus for processing nuts and fruits, and more specifically, to a mobile apparatus that picks-up fruits and nuts from the ground and conditions them, in bulk. The mobile apparatus conditions the fruits and nuts by removing debris with a combination of a belted conveyor, a high volume fan and optional equipment, such as a shaker apparatus.

BACKGROUND OF THE INVENTION

Currently, best management practices for farms, orchards and groves require the use of technologies that minimize the generation of dusts and debris. Dust control measures are required in many current regulatory efforts, implemented to reduce dust impacts to workers on-site, and to residents and citizens offsite. Conservation is also a benefit of reductions in dust generation typically associated with harvesting operations in drier climates.

Specifically, in the harvesting of nuts and fruits, these fruits and nuts are first shaken or otherwise removed from the trees, bushes or vines, as required. The modem retrieval of these nuts and fruits from the ground conventionally requires the use of a conveyor pick-up system. To minimize the generation of dust from these pick-up operations, the conveyors are maintained under negative air pressure. One such fan and conveyor system for ground deposited nuts, is shown in U.S. Pat. No. 5,001,893, which employs a large fan to draw dust and debris through a series of open mesh conveyors to clean a bulk of an agricultural product stream retrieved from an orchard floor. Similarly, U.S. Pat. No. 5,373,688, teaches that the fan can be modified and improved, to better direct the exhausted debris away from the harvester apparatus. U.S. Pat. No. 5,421,147 shows additional improvements to the fan and conveyor system, which includes a debris segregating system, for separating light from heavier debris, and for the improved design of the conveyor itself, to better break-up the debris picked-up into the harvester.

These prior harvesting apparatus perform well to clean dust and debris from the fruits and nuts collected. However these devices generate significant amounts of dust or "PM" defined as particulate material. Specifically, particulate material of greatest concern to human health are "PM10," which are typically definded as respirable particulate material or dusts with an average aerosol diameter" of less than 10 microns, and PM2.5, which are dusts with an average aerosol diameter of less than 2.5 microns. With significant pressures from regulatory governmental agencies to drastically reduce dust generated by harvesting operations and further to conserve top soils, a great need exists for harvesters with lower dust emission rates.

DETAILED DESCRIPTION OF SPECIFIC EMBODIMENTS

Figure 1:
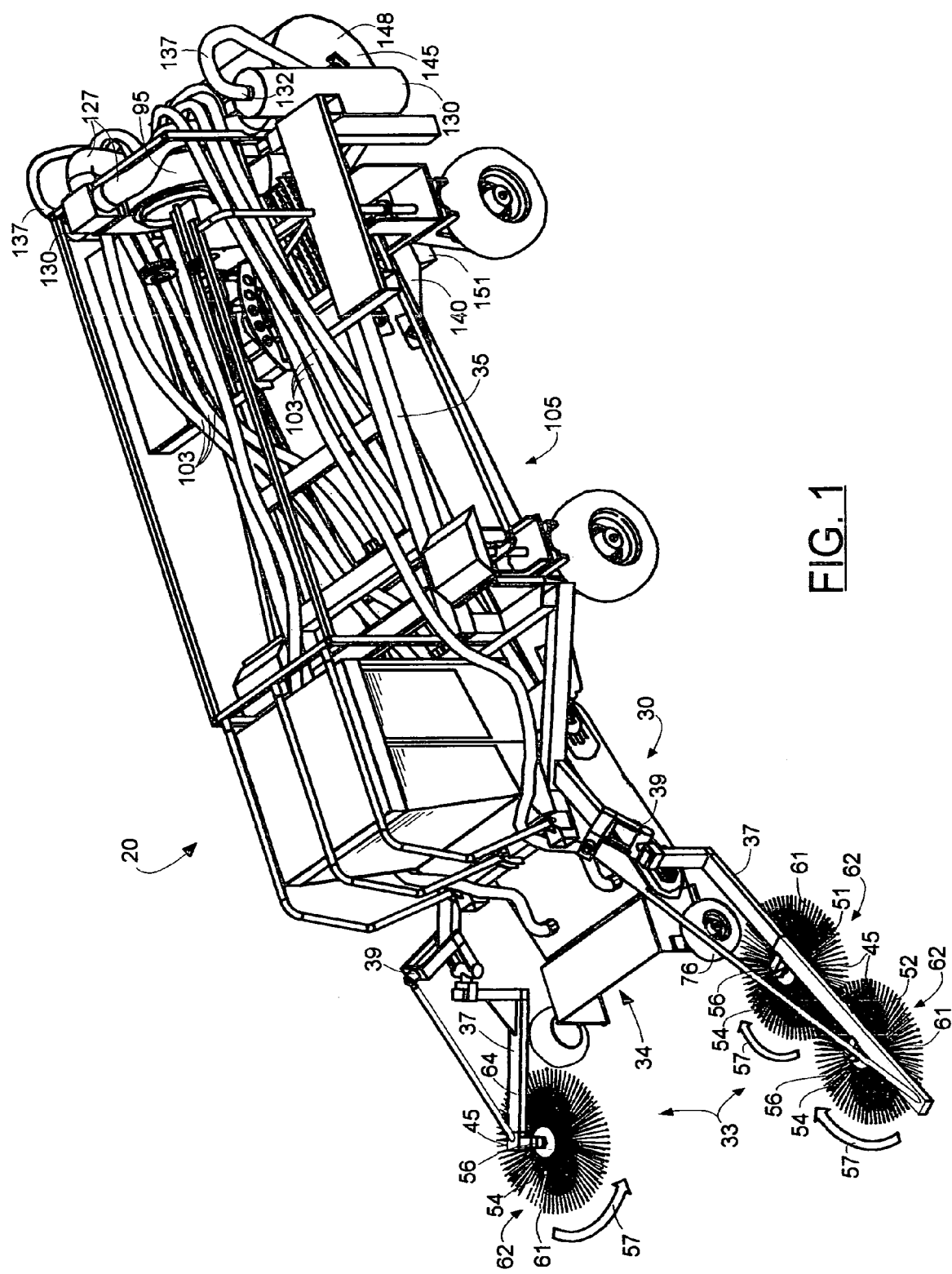
FIG. 1 is a perspective view of a conditioner apparatus, according to an embodiment of the invention.

The present invention provides a conditioning apparatus and a similar harvest transporting apparatus, both apparatus for the retrieving and processing of bulk harvested crops, such as nuts, fruits and the like. The apparatus both employ recirculated air with a belted conveyor to clean the bulk harvested crop. As shown in FIGS. 1 through 8, and 19 through 27, the conditioning apparatus, herein called a conditioner 20, picks-up the bulk harvested crop from the ground, and remove debris from the nuts with a partially enclosed belt conveyor system. In the conditioner, the belt conveyor system is zoned, with each zone maintained under a balanced, negative air pressure. After processing, the conditioning apparatus deposits the bulk harvested crop in a windrow to dry, where it can then be retrieved by the harvest transporting apparatus, herein referred to as a harvester 21, as shown in FIGS. 9 through 18, and 28 through 34. Like the conditioner, the harvester also includes a partially enclosed belt conveyor, as discussed and described further herein.

Conditioner

FIGS. 1 through 8 show the conditioner 20, with features of a preferred embodiment of the present invention. The conditioner is well suited for the processing of almonds 22, but could be utilized in the processing of any one of a variety of harvested crops, the harvested crop on lying on a ground surface 25, and removed from a tree. As an alternative to the almonds, the harvested crop may be another variety of nut, such as cashews, chestnuts, hazelnuts, macadamia nuts, pecans, walnuts and tung nuts. Certain fruits, such as figs and oranges, and any fruit, nut or vegetable, as conventionally known to require collection and processing from the ground, may be served with the present invention.

The removal of the almonds 22 from the tree is conventionally achieved by a shaker. The design and operation of the shaker is well known in the field of nut harvesting. The almonds, in an unprocessed condition and covering the ground surface 25. This ground covering of almonds is referred to herein as a carpet 28. Along with the almonds, the carpet includes debris 29. The debris is typically a collection of dirt, leaves, twigs and trash, as normally found littering the ground surface of any orchard, farm or grove.

Figure 2:
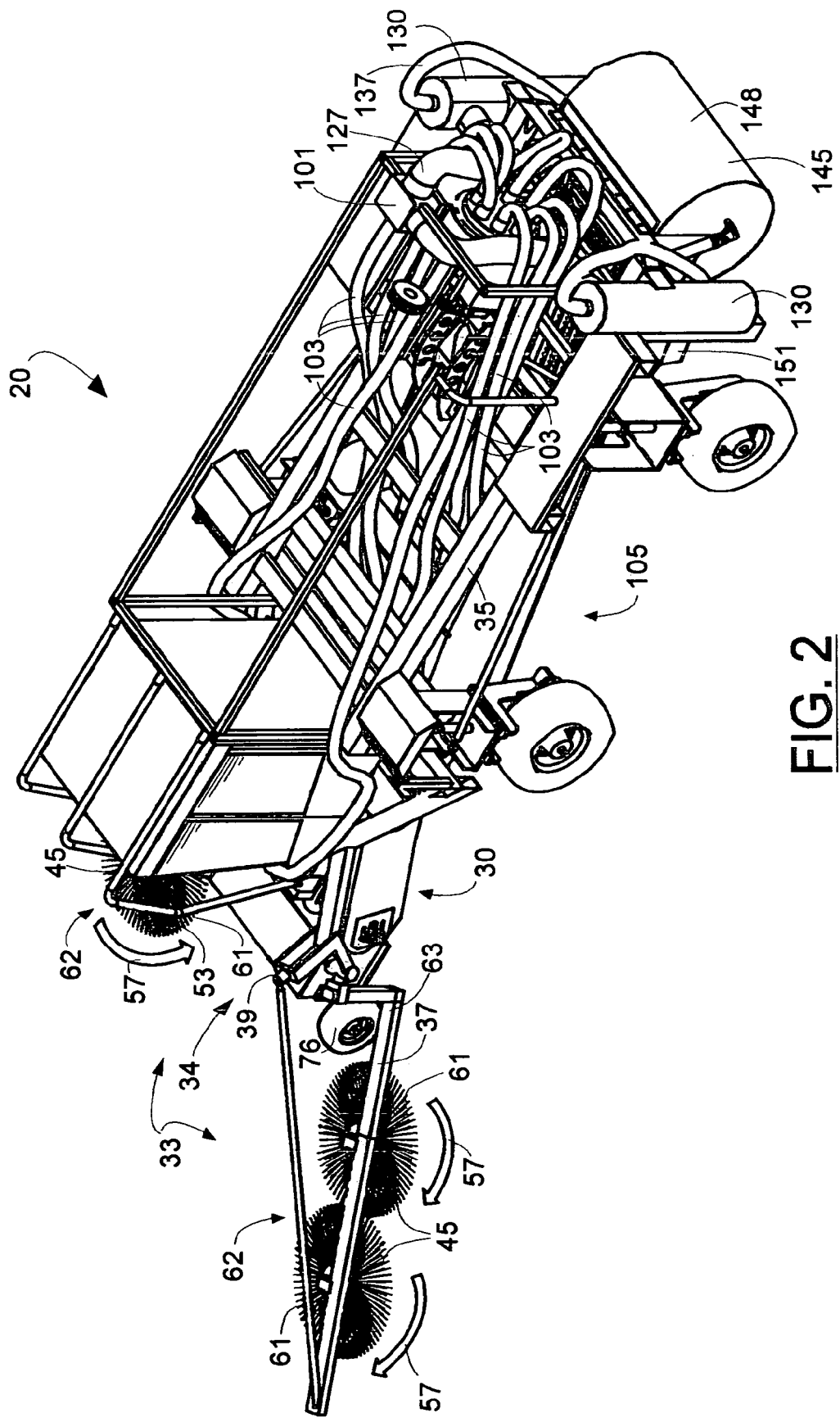
FIG. 2 is a perspective view of a conditioner apparatus, according to an embodiment of the invention.
Figure 3:
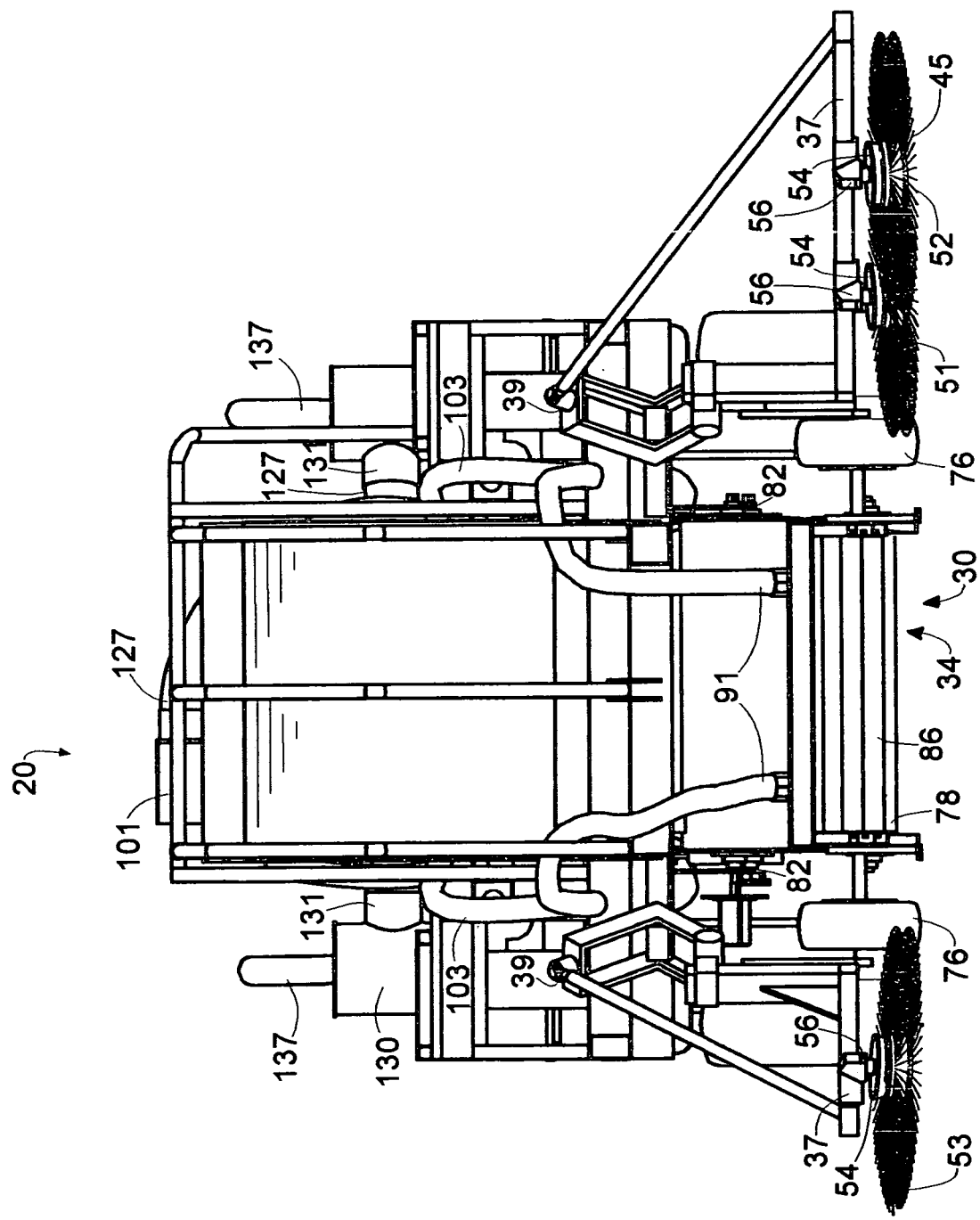
FIG. 3 is a front end view of a conditioner apparatus, according to an embodiment of the invention.
Figure 8:
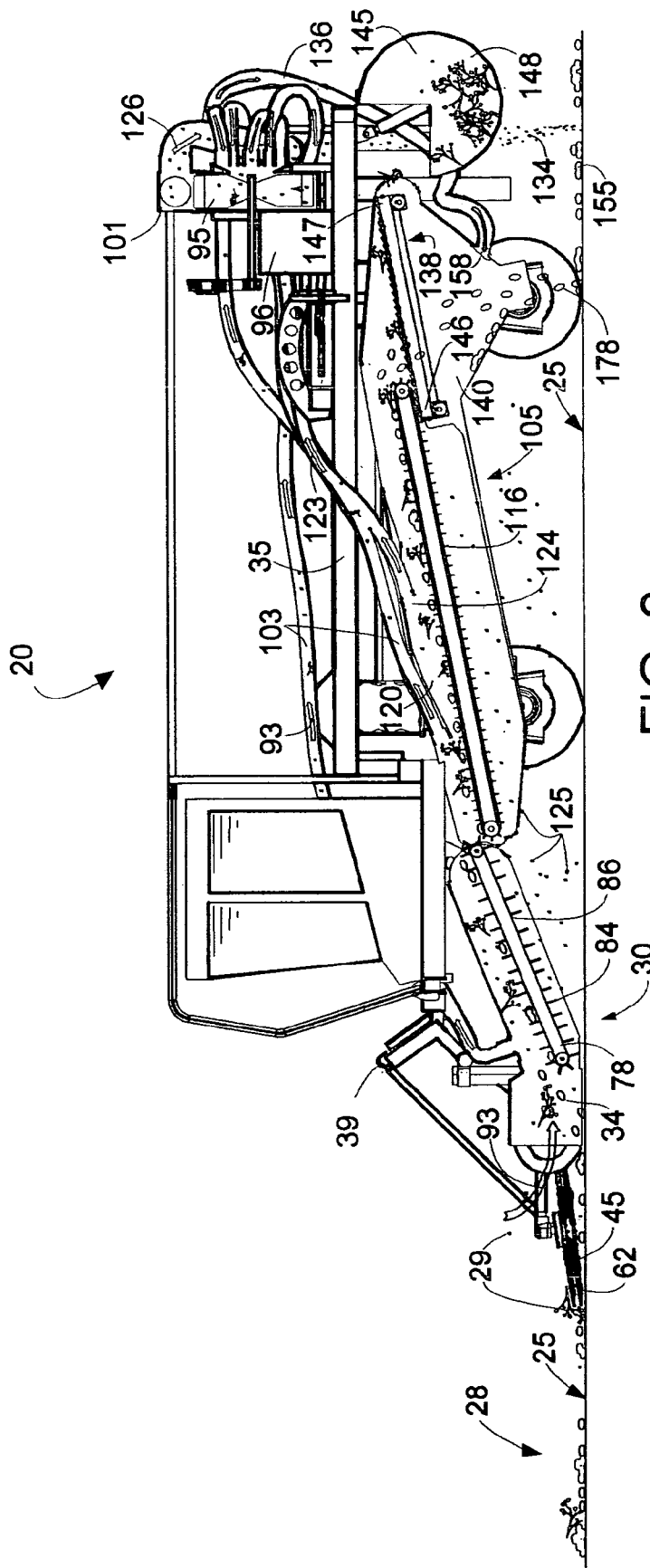
FIG. 8 is a partially sectioned side view of a conditioner apparatus, according to an embodiment of the invention.

To collect the carpet 28 of almonds 22 and debris 29, scattered on the ground surface 25, as shown in FIG. 8, the conditioner 20 employs an uptake section 30, as shown in FIGS. 1 through 5. The uptake section preferably includes a sweeper array 33, and an infeed scoop 34, as shown in FIGS. 1 and 3. The sweeper array is positioned to contact the ground surface, immediately ahead of the infeed scoop. With the sweeper array, the conditioner 20 can accommodate the scattered carpet of almonds, and so reduce or eliminate the need for pre-sweeping or consolidating the almonds into a row.

The conditioner 20 of the present invention is preferably modular in design, with components mounted on a conditioner frame 35. The sweeper array 33 extends from the conditioner frame 35. As shown in a preferred embodiment in FIG. 1, the sweeper array employs a brush armature 37 mounted to the conditioner frame. Most preferably, Two brush armatures are utilized, each raised and lowered as desired by an arm actuator 39. The arm actuator is preferably hydraulic, powered from a central hydraulic system.

The conditioner 20 is preferably configured in a self contained and self powered configuration, as shown in FIGS. 1 through 9, which includes the central hydraulic system. Alternatively, the conditioner can be configured as a trailer apparatus, similar in towed configuration to the embodiment of the harvester 21, shown in FIGS. 10 through 14. For the towed configuration, a tractor 200 preferably provides the hydraulic power for operation of the conditioner. The sweeper array 33 may be mounted to the front of the tractor, or as an alternative, to the front of the trailer, in tow.

For the conditioner 20, each brush armature 37 receives one or more of a flat, rotary brush 45, to form the sweeper array 33. The term "flat" is used to describe the rotary brushes, in that the brushes are oriented flat to the ground surface 25, as shown in FIG. 3. Mounted in the sweeper array, the rotary brushes are also referred to herein in aggregate as "the brushes." Most preferably each brush armature includes two of the rotary brushes, a first brush 51, and a second brush 52, and optionally a third brush 53, mounted along one of the brush armatures. The brushes all include a hub 54. The hub is centrally located within each brush. The hub rotatably mounts to an angle bracket 56, which is then mounted to the brush armature. Each of the brushes rotate in a direction of brush rotation 57, as also shown in FIGS. 1 and 2.

For a preferred embodiment of the present invention, the brushes of the sweeper array 33 have bristles 61 that are included in a bristle set 62. The bristle set is preferably a narrow stack of conventional, off-the shelf "wafer" brush bristles. Most preferably, a polypropylene wafer set for a standard, three foot diameter "tube broom" is utilized for the bristle set, as manufactured by Three "B" Brush Manufacturing Co., of Lubbock, Tex., U.S.A. Any rotary brush with an approximate diameter, from one to three feet or so, could be utilized in the present invention. The term "approximate" is used herein throughout, including this detailed description and the attached claims, to refer to a range of values, understood by a person skilled in the pertinent field or skill, as being substantially equivalent to the herein stated values in achieving the desired results, in a range typical to the selection, accuracy, or precision of conventional tooling, or other manufacturing techniques.

The orientation of the bristles 61 in the wafered bristle set 62 performs well with the sweeper array 33, and far better than conventional "gutter broom" brush bristle sets. Conventional paddles, gutter broom brushes and tube brooms all fail to efficiently sweep the carpet 28, including the almonds 22 and debris 29, to the infeed scoop 34, while generating a minimum of particulate.

For the bristle set 62, any type or configuration of bristle material, with a structure of the bristles 61 that is substantially "radial" in form, is most preferred. By "radial," the bristles emanate from the hub 54, and are directed radially from the hub. Any such radial brush design should perform nominally well for use with the rotary brush array 33 of the conditioner 20. The bristles may be plastic, metal, or a combination of conventional bristle materials. The bristles of any of the flat, rotary brushes 45 may be pre-manufactured for use with conventional sweepers, or custom built for the specific use with the present invention. The use of the wafer type of brush as the preferred bristle set, with its bristles directed radially from hub, provides superior material pickup and sweeping characteristics.

Preferably, two of the brush armatures 37 are used, with each brush armature receiving a minimum of two of the flat, rotary brushes 45. Most preferably, as shown in FIGS. 1 and 2, the rotary brush array 36 includes a first brush armature 63 and a second brush armature 64, each including one or more of the flat rotary brushes. The first brush armature includes the first brush 51 and the second armature includes the second brush 52. Additional flat rotary brushes may be placed on either of the armatures. As most preferred, the second brush armature can include a third brush 63. Alternatively, the armatures can include several additional brushes, as suited to the needs of the particular row spacings and width of carpet 28. For a preferred embodiment of the conditioner of the present invention, the brush armature receives each of the plurality of rotary brushes, with each of the plurality of rotary brushes attached to the brush armature by an angle bracket 66.

Additionally, the first brush armature 63 and the second brush armature 64 are preferably pivotable and swingable. These actions provides the conditioner 20 with the ability to address the carpet 28 in a wide swath, rather than a consolidated windrow of material. In conventional nut conditioning devices, a separate sweeping operation must take place prior to the pick up of any material by a conditioner. With each of the flat, rotary brushes of the rotary brush array, attached to their respective hubs 54, and rotatably mounted to their respective angle brackets 66, the brushes rotate in their direction of rotation 36, as shown in FIGS. 1 and 2. The rotation of the brushes is selected to bring the almonds 22 toward the infeed scoop 34 of the conditioner 20, ahead of the brush array.

Figure 4:
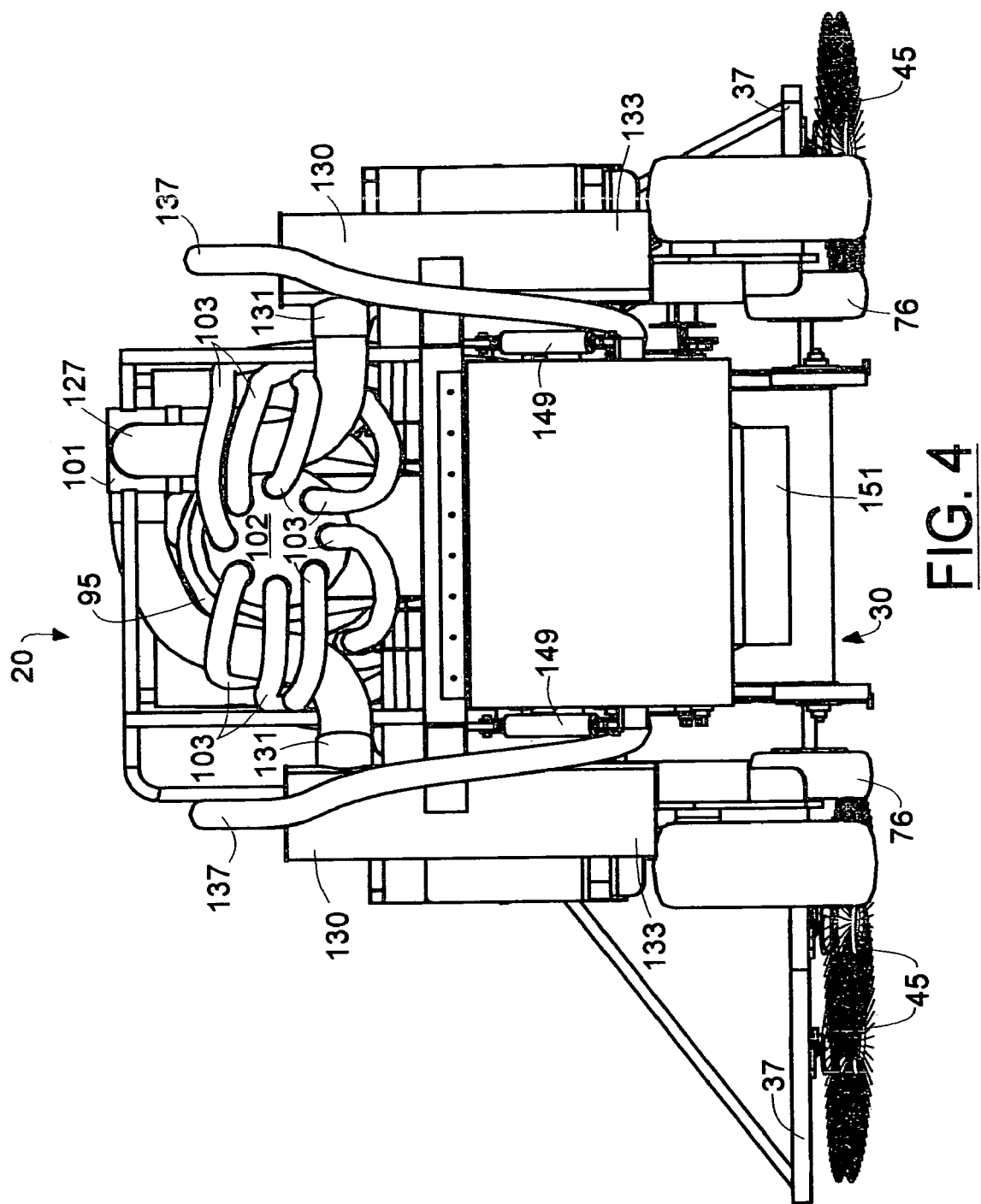
FIG. 4 is a rear end view of a conditioner apparatus, according to an embodiment of the invention.
Figure 5:
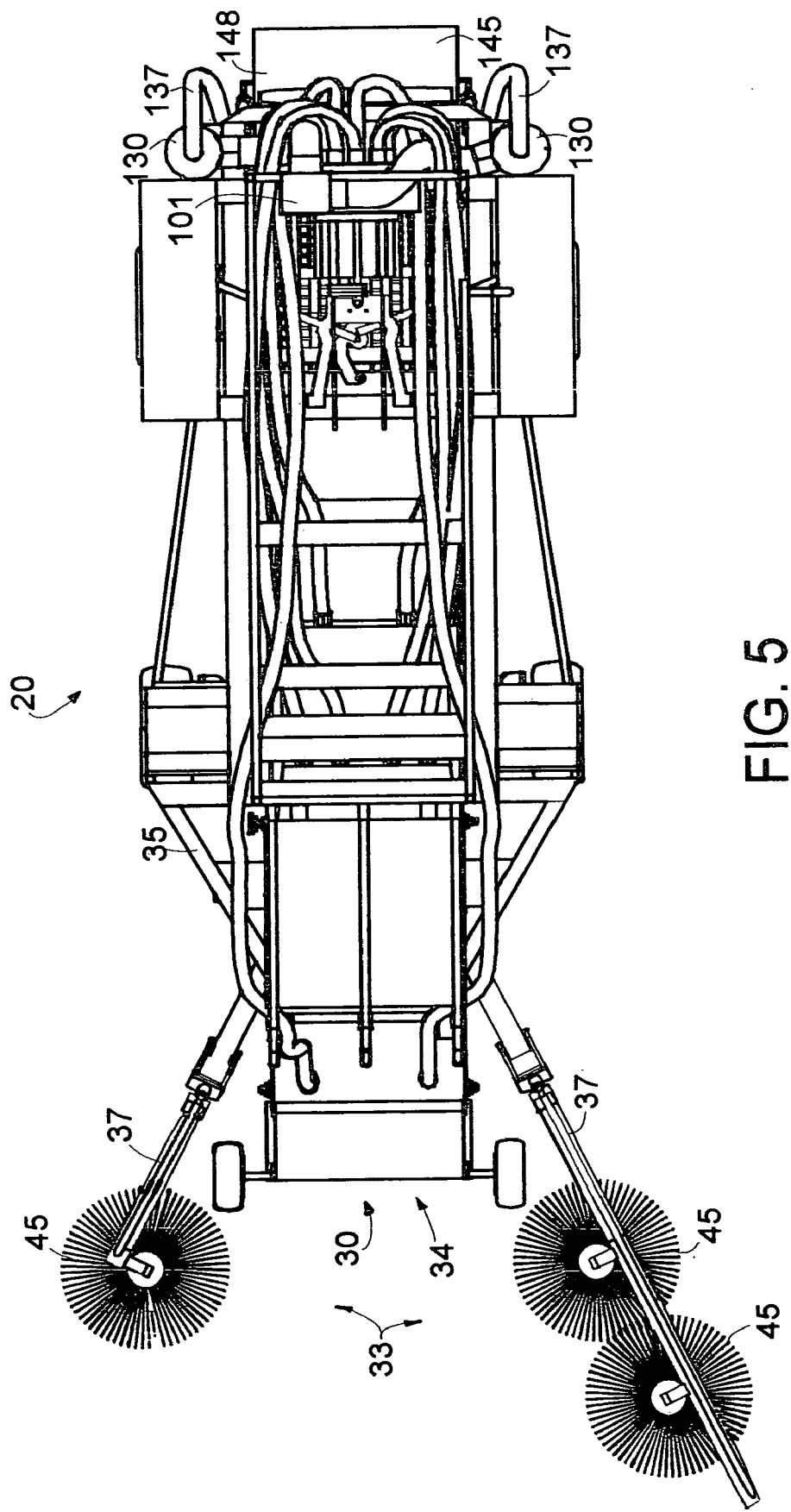
FIG. 5 is a top view of a conditioner apparatus, according to an embodiment of the invention.

Most preferably, the plane of rotation 63 is "skewed" for each successive, neighboring brush, so that the brushes 45 appear to overlap in a plan view, as shown in FIG. 5, but are most preferably separate from each other by a "clearance offset" in the plane of rotation, as shown in FIGS. 3 and 4. This skewed orientation of the brushes eliminates a "dead space" or gap, between the brushes, and so prevents any swept material from gathering between the brushes.

The rotation of the brushes 45 is also preferably accomplished by hydraulics. Hydraulic motors are most preferably included within each angle bracket 56 on each brush armature 37. The general configuration and operation of these hydraulic motors and controls are of a conventional design. These conventional controls are known to those skilled in hydraulic actuation and controls. The preferred hydraulic system of control for use with the present invention is powered by a central hydraulic pump powered by the engine of the conditioner 20. The engine of the conditioner is preferably gas, diesel or propane powered. Alternatively, the central hydraulic pump could run by a "power-take-off," as is well known in persons skilled in farming and orchard equipment.

In a preferred embodiment of the conditioner 20, the infeed scoop 34 can also include a pair of infeed wheels 76, to maintain and track the infeed scoop with the ground surface 25. The infeed scoop gathers the carpet 28 of almonds and debris 29, as consolidated by the sweeper array 33, for feeding an uptake conveyor 78. The uptake conveyor extends from the conditioner frame 35 and terminates with the infeed scoop. The consolidated carpet of almonds and debris, when gathered into the infeed scoop and picked up by the uptake conveyor, can now be referred to as an unprocessed stream 80.

Preferably, the infeed scoop 34 and uptake conveyor 78 can be raised or lowered by action of an infeed actuator 82. The infeed actuator, as shown in FIG. 3 can alternatively raise or lower the infeed scoop and attached uptake conveyor. The raised position is desirable for quick travel, and adjustment to the lowered position needed for best tracking along the ground surface 25.

Figure 7:
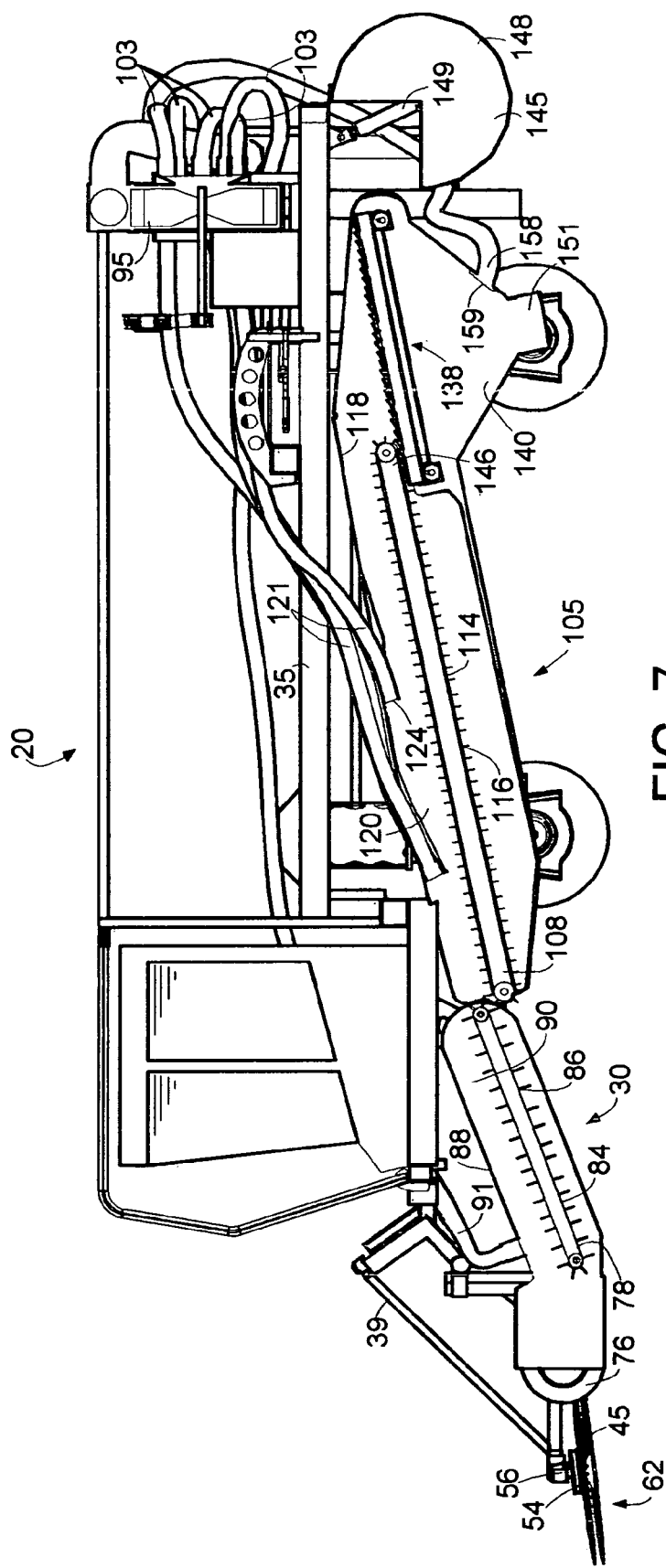
FIG. 7 is a sectioned side view of a conditioner apparatus, according to an embodiment of the invention.

The uptake conveyor 38 transfers the unprocessed stream up and further into the conditioner The uptake conveyor preferably includes an uptake belt 84, which is equipped with uptake flights 86, as shown in FIG. 7. The uptake flights are parallel slats of metal and preferably rubber, that serve to prevent the unprocessed stream 80 from falling, back toward the infeed scoop 34 and the ground surface 25. The uptake belt is preferably an open, metal mesh, sized to retain the almonds 22 on the uptake belt. The uptake belt is also sized and configured to provide strength, while allowing air to flow up through it, and allow debris 29 to drop down out of it. The uptake conveyer is covered by an uptake cover 88, which forms an uptake plenum 90 over the uptake belt.

As shown in FIG. 8, an uptake air return duct 91 connects to the uptake plenum 90, to pull an uptake suction airstream 93, in through the infeed scoop 34, across the uptake belt 84, and within the uptake plenum. The uptake air return connects to the uptake cover of the uptake plenum at an uptake inlet 94, for pulling the uptake suction airstream from the uptake plenum. A multiple of uptake inlets are preferably employed as shown in FIGS. 1 through 8, to provide for evenly distributed flow across the uptake plenum.

The uptake plenum 90 is much smaller than the plenums of prior nut collecting devices. The relatively small uptake plenum provides for a controlled and high velocity airstream 92 directed through the uptake plenum. The uptake suction airstream 93 is substantially homogenous throughout the uptake plenum, and a strong suction is attained with a minimum of total air flow. This provides for an operational economy by reducing the requisite fan size, and by reducing the air filtration necessary to remove the debris 29, entrained in the uptake suction airstream.

The uptake suction airstream 93 is pulled from the uptake plenum 90 and routed to a conditioner fan 95, powered by a conditioner fan motor 96. The conditioner fan is preferably a conventional centrifugal fan, sized to serve the air movement need of the present invention. For a preferred embodiment of the conditioner 20, a fan with a centrifugal, backward inclined blade type of fan blower, rated to deliver an approximate air flow of 4,500 CFM, at 1 inch static pressure, when driven with a 25 to 30 BHP motor, is well suited for the present invention. However, any fan, suited to industrial use with the desired performance characteristics, could be utilized. The conditioner fan motor is most preferably hydraulic, powered from a central hydraulic pump 99, to deliver approximately 25 HP. The central hydraulic pump can be placed on the conditioner frame 35 to supply high pressure hydraulic fluid for actuating all powered elements of the conditioner, including the drive, steering, motors, and the sweeper array 33.

As is conventional, the conditioner fan 95 has a conditioner fan supply 101 and a conditioner fan return 102. The uptake air return duct 91 connects the uptake plenum 90 to the conditioner fan return. As shown in FIG. 4, the conditioner fan return has a plurality of conditioner fan return ducts 103 attached to it. Most of the plurality of conditioner fan return ducts connect to a separation section 105 of the conditioner 20. The separation section includes a separation conveyor 108 that receives the processed material stream 80 from the uptake belt 84 of the uptake conveyor 78. The separation conveyor preferably includes a separation belt 114, which is equipped with separation flights 116, as shown in FIG. 8. Similar to the uptake flights 86, the separation flights are parallel slats of metal and preferably rubber, that serve to move the unprocessed stream along the separation conveyor.

The separation conveyor 108 is substantially horizontal, with a slight upward tilt from the uptake conveyor 78. In contrast, the uptake conveyor has a significant tilt of approximately 30 to 45 degrees upward from horizontal. Therefore, the separation flights 116 of the separation conveyor need only to be in the range of approximately 1 to 3 inches in height, while the uptake flights function best at approximately 4 to 6 inches in height. Like the uptake belt, the separation belt is preferably an open, metal mesh, sized to retain the almonds 22 on the separation belt. Like the uptake belt 84, the separation belt is also sized and configured to provide strength, while allowing air to flow up through it, and allow debris 29 to drop down out of it.

As shown in FIG. 7, separation section 105 includes a separation cover 118 over the separation conveyer 108. This covering forms a separation plenum 120 over the separation belt 114. Like the uptake plenum 90, the separation plenum is most preferably maintained under negative air pressure during operation of the conditioner 20. A separation air return duct 121 connects to the separation plenum 120, to pull a separation suction airstream 123 across the separation belt 114 and through the separation plenum. The separation air return duct connects to the separation cover of the separation plenum at a separation outlet 124, for pulling the separation suction airstream from the separation plenum. A multiple of separation outlets are preferably employed as shown in FIG. 7, to provide for evenly distributed flow across the separation plenum.

Like the uptake plenum 90, the separation plenum 120 is much smaller than the plenums of prior nut collecting devices. The relatively small separation plenum provides for the controlled and high velocity airstream 92 directed through the separation plenum. With the separation plenum having a uniform cross-section along its entire length, the separation suction airstream 123 is substantially homogenous and constant throughout the separation plenum. A strong and consistent suction is attained throughout the separation plenum with a minimum of total air flow. Again, this provides for an operational economy by reducing the requisite size and power of the conditioner fan 95, and by reducing the air filtration necessary to remove the debris 29, from the separation section 105 of the conditioner 20, especially the dusts and leaves that were removed from the processed stream 80 and entrained by the separation suction airstream.

As shown in FIG. 8, some of the debris 29, especially gravel and granules of dirt, drops through the belts of the conveyors, either the uptake belt 84, or the separation belt 114, creating a fallout 125. This particulate fraction of the debris, termed "fallout," relieves the need to pull additional suction, required to lift heavier materials from the debris, if this heavier fallout material was retained on instead of allowed to pass through the respective belts.

The separation suction airstream 123 is pulled from the separation plenum 120 and routed to the conditioner fan return 102. Most preferably, as discussed above, the plurality of conditioner fan return ducts 105 are employed to collect the debris 29 under suction. As shown in FIG. 7, six of the separation air return ducts are utilized, each routed from the separation outlet 124 in the separation cover 118, to the conditioner fan return.

Figure 6:
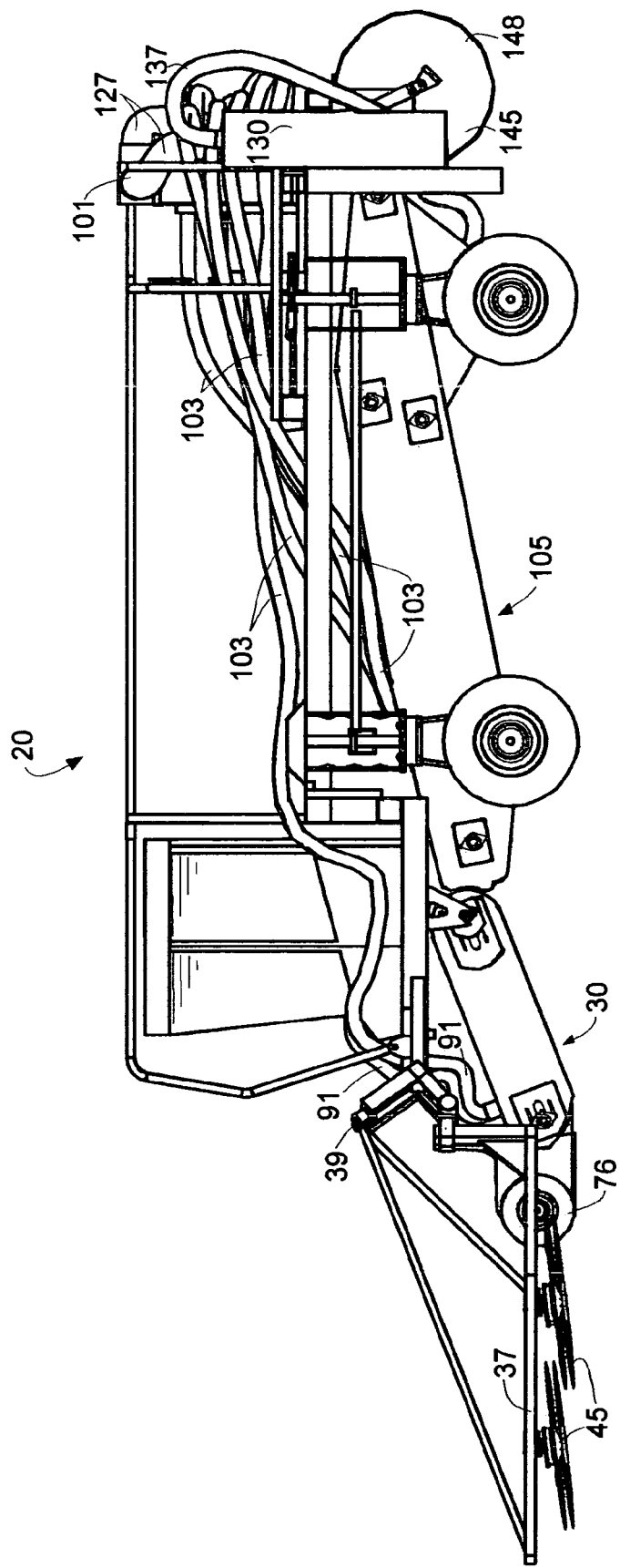
FIG. 6 is a side view of a conditioner apparatus, according to an embodiment of the invention.

The conditioner fan 95 generates a supply air stream 126, which is distributed from a supply air duct 127 connected to the conditioner fan supply 101. As preferred, the supply air duct can be a multiple of supply air ducts, each routed to a conditioner pollution control device 130. Most preferably, for the conditioner 20 of the present invention, the conditioner pollution control device is a settling chamber, as shown in FIGS. 4 and 6. The settling chamber includes a chamber inlet 131, a supply air outlet 132, and a dropout 133. As an alternative, any pollution control device known to those skilled in the removal of particulate from the airstream 92 could be employed. The settling chamber is most preferably of a conventional, single chamber design, but could include baffles, cyclones, filters or any such mechanisms for entraining, knocking out, or settling out debris 29 carried by the supply air stream into the conditioner pollution control device. The particulate debris that settles out of the conditioner pollution control device, exits from the dropout as a dropout material 134.

A cleaned supply airstream 136 exits through a cleaned supply air duct 137. The cleaned supply air duct connects to the supply air outlet 132 of the conditioner air pollution control device 130. Instead of discharging this cleaned airstream to the atmosphere, as typical of prior devices, the cleaned airstream is re-used by the conditioner 20. Again, in a preferred embodiment of the conditioner, two cleaned supply air ducts are utilized, one routed from each of two settling chambers, acting as the conditioner air pollution control devices.

From the separation conveyor 108, the processed material stream 80 is fed to a walker assembly 138. At this pont in the conditioner 20, lighter dust and particulate materials have been removed from the processed material stream either as the dropout material 134 from the conditioner pollution control device 130, or as the as the fallout 125 that passes through the mesh of the separation belt 114. The only debris 29 processed material stream that remains is the almonds 22, and a large debris 139, such as sticks and twigs. In the walker assembly, the sticks and twigs are retained, while the almonds fall through to a nut hopper 140, positioned below the walker assembly, as shown in FIG. 8.

The remaining large debris 139, retained in the walker assembly 138, is dumped into a trash bin 145. As shown in FIG. 8, the walker assembly includes a walker infeed end 146, that receives the processed material stream 80, and a walker discharge end 147, that dumps the large debris into the trash bin. The trash bin is located to the rear of the conditioner 20, and is preferably a rotatable drum 148. The trash bin can be emptied by rotating the drum with a pair of drum actuators 149. The drum actuators, are preferably hydraulic, and conventionally operable with the central hydraulic system.

As shown in FIGS. 7 and 8, the nut hopper 140 includes a nut outlet 151 at the bottom of the nut hopper, proximate to the ground surface 25. In a preferred embodiment of the conditioner 20, a discharge skirt 152 is also included at the nut outlet to direct the almonds 22 as they leave the nut hopper.

The almonds 22 dumped out of the nut hopper 140, form a windrow 155 on the ground surface. The windrow is preferably placed between the rows of trees, most preferably in the middle. This location in the middle, between the tree rows, receives the most sunlight, and is typically dry and slightly humped for the best drainage. The windrow of deposited almonds is free from debris 29 and is formed to best provide for drying the almonds in a short term, typically for one to two weeks.

To additionally aid flow of the almonds 22 out of the nut hopper 140, the nut hopper is preferably equipped with a hopper supply air inlet 158. The hopper supply inlet preferably connects to the nut hopper proximate to the nut outlet 151, near the bottom of the nut hopper. A nut hopper grille 144 can be placed over the hopper supply inlet to prevent almonds from backing-up and entering the hopper supply air inlet. The hopper supply air inlet is connected to the cleaned supply air duct 137, and so receives the cleaned supply airstream 136 from the conditioner air pollution control device 130. The cleaned supply airstream serves to "fluidize" the almonds as they are discharged from the nut hopper. This fluidization prevents the almonds from packing together and blocking the nut outlet. With the forced airflow, the almonds gain buoyancy and flow out of the nut hopper.

As discussed above, the cleaned supply airstream 136 is recirculated air, removed from the uptake section 30 and the separation section 105. By injecting the cleaned supply airstream into the nut hopper, positive air pressure is maintained within the nut hopper. This positive air pressure within the nut hopper prevents debris 29 from entering the conditioner through the nut outlet 151.

Additionally, the cleaned supply airstream 136 feeds the separation suction airstream 123 of the separation section 105. This recycled circuit of air regenerates airflow within the conditioner 20. Much of the air required by the separation section to form the separation suction airstream 123 can be supplied by the cleaned supply airstream, and so greatly reduces any intake of outside air by the separation section. The majority of outside air introduced into the conditioner is pulled through the infeed scoop 34 of the uptake section 30. This air flow pattern is highly advantageous. In picking up the almonds 22 from the ground surface 25 the sweeper array 33 generates significant amounts of airborne debris 29 at the front of the conditioner. As shown in FIG. 8, the uptake suction airstream 93 is heavy with the debris laden air drawn from the infeed scoop. This debris can only be removed from the air, if the debris laden air is drawn into the conditioner. With most of the air drawn into the conditioner pulled from the infeed scoop, the air cleaning efficiency of the conveyor is maximized. To the rear of the conditioner, in the nut bin and the separation section, the recirculated and cleaned supply airstream pressurizes these rearward portions of the conditioner, maintaining them substantially free from additional outside debris. After separation occurs, the air stream 92 flows into the conditioner air pollution control device 130, which is preferably the low pressure settling chamber, where velocity drops. Only about 20% of the low velocity air stream is discharged with the foreign material. By preventing the constant exhaust of high velocity air and dust, so commonly associated with nut harvesting, we greatly reduce potential "PM10," "PM2.5," or otherwise defined respirable particulate contributions to the atmosphere.

Alternative Conditioner

FIGS. 19 through 27 show a preferred alternative configuration of the conditioner 20. This alternative embodiment of the conditioner is also a mobile apparatus that cleans and conditions a harvested produce, such as almonds 22. The alternative conditioner also includes an uptake section 30 that collects the almonds, which after removal from the tree lay on the ground surface 25, in a carpet 28 or "scattered covering." The scattered covering includes the harvested produce almonds, and additionally includes debris 29, which must be separated from the almonds in harvesting processes.

Figure 27:
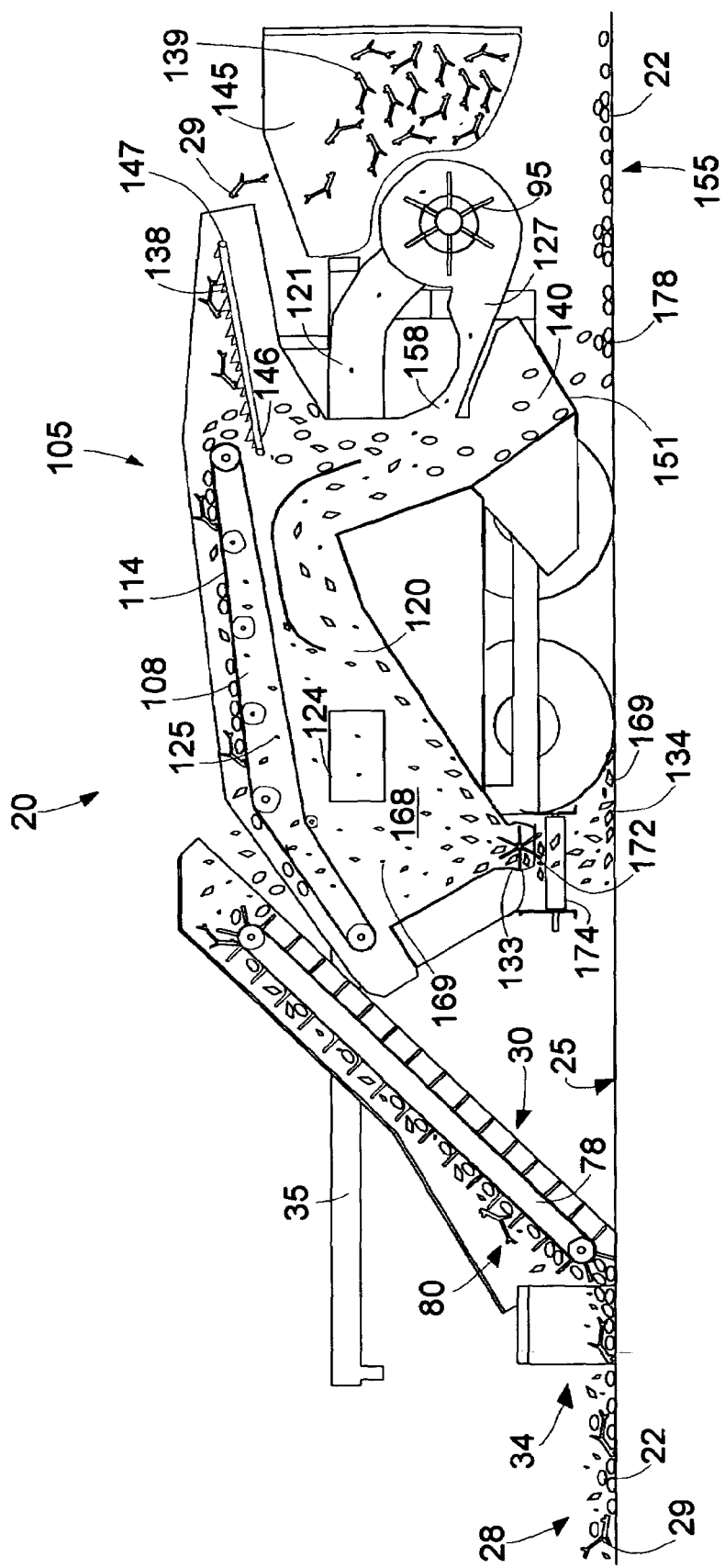
FIG. 27 is a sectioned side view of a conditioner apparatus, according to an embodiment of the invention.
Figure 28:
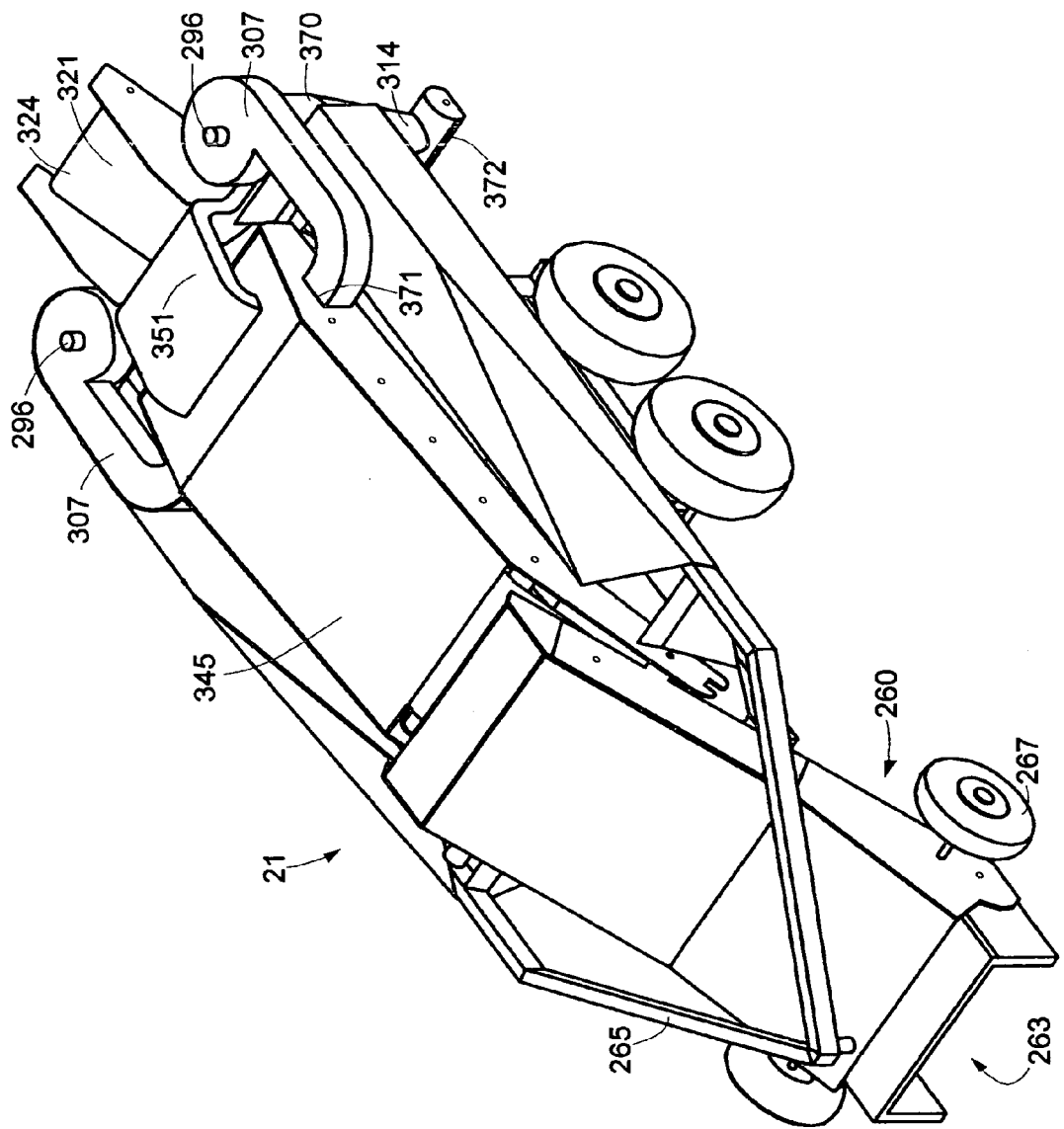
FIG. 28 is a perspective view of a harvester apparatus, according to an embodiment of the invention.
Figure 29:
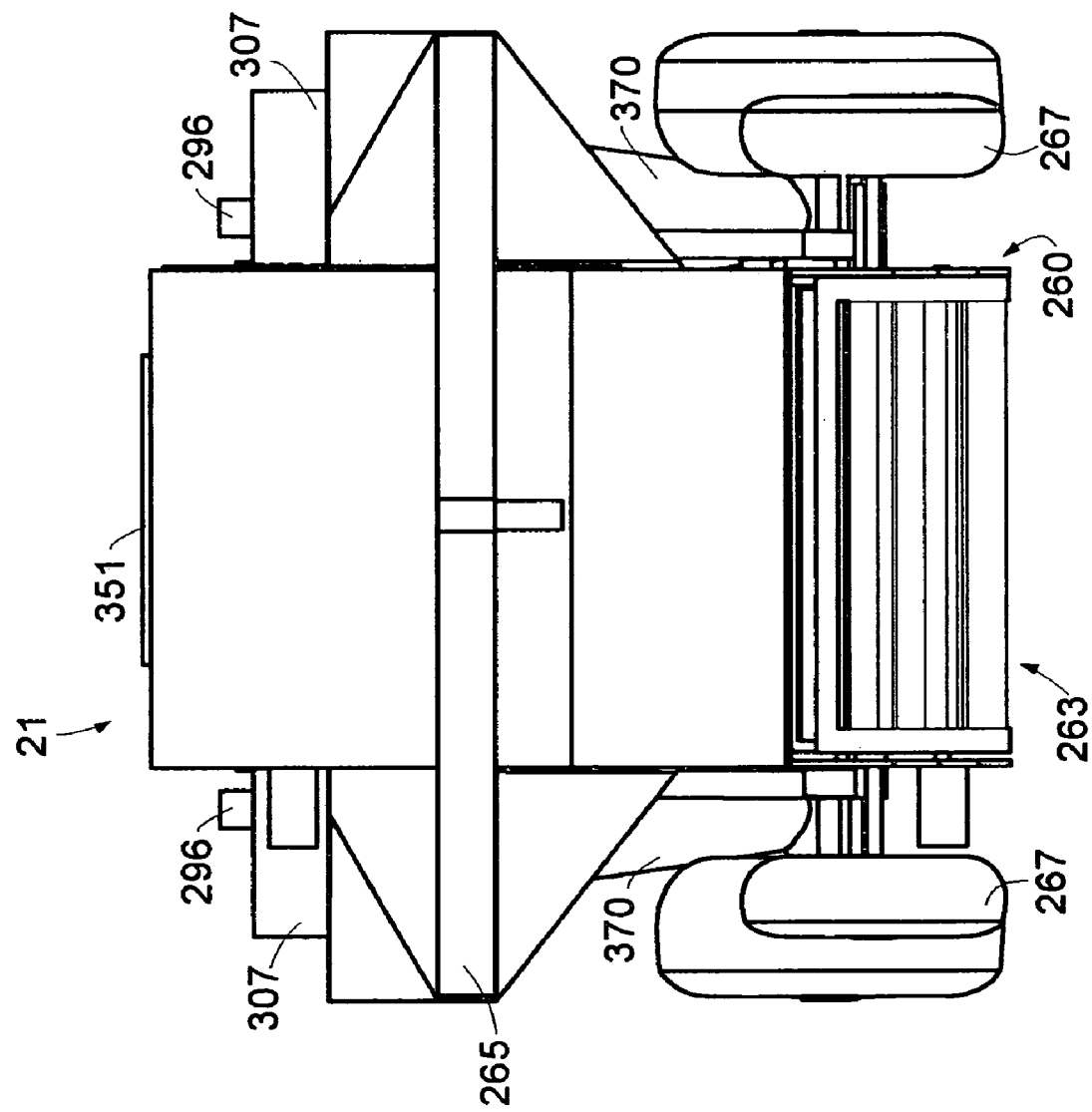
FIG. 29 is a front end view of a harvester apparatus, according to an embodiment of the invention.
Figure 30:
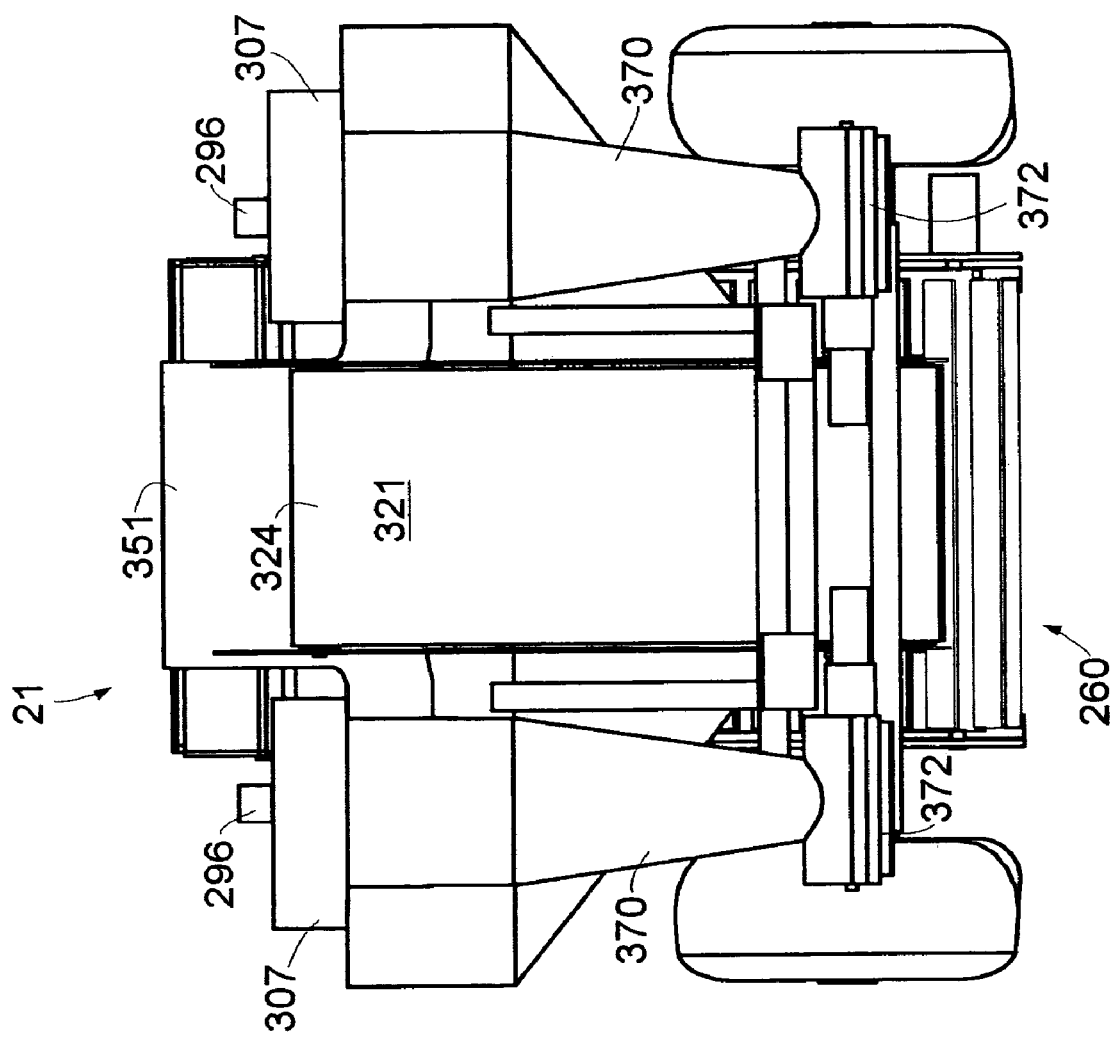
FIG. 30 is a rear end view of a harvester apparatus, according to an embodiment of the invention.
Figure 31:
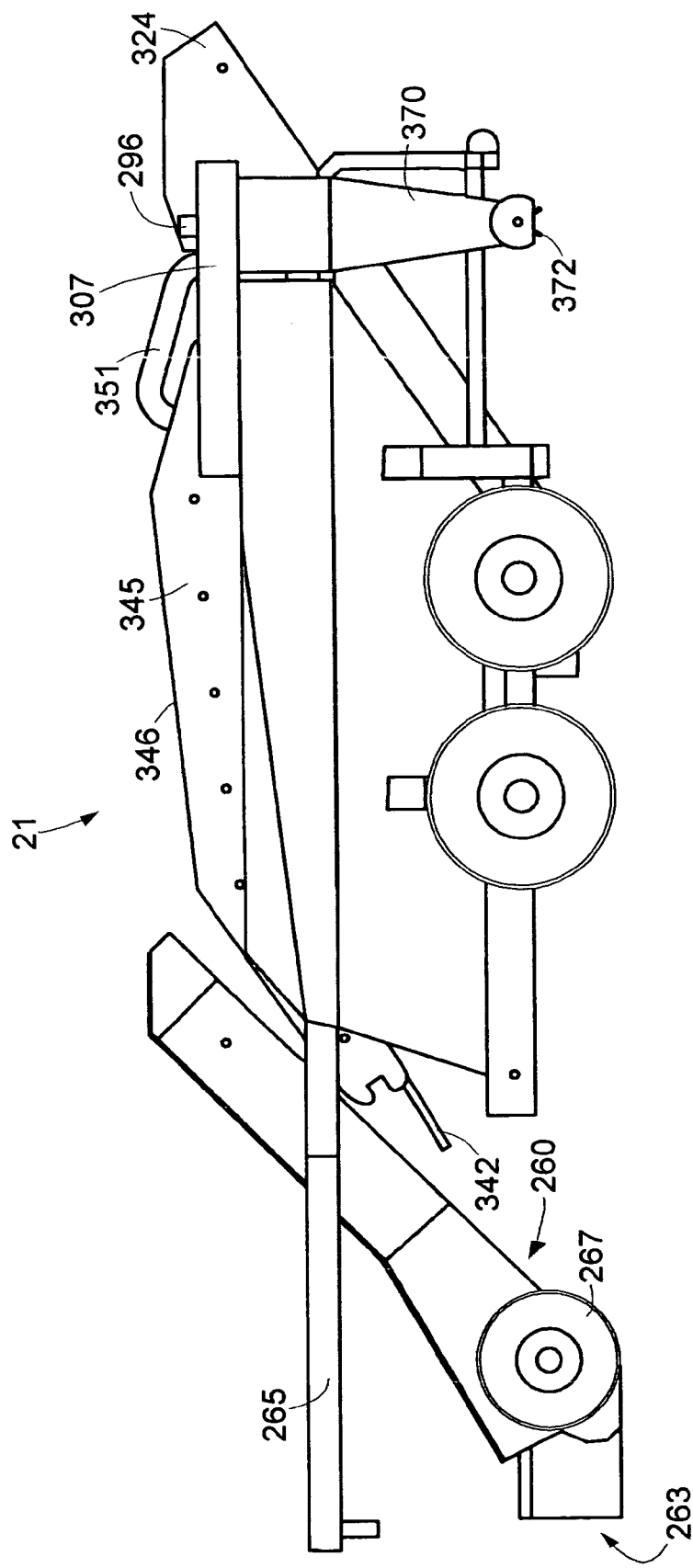
FIG. 31 is a side view of a harvester apparatus, according to an embodiment of the invention.

The uptake section 30 includes the infeed scoop 34 and uptake conveyor 78, with the infeed scoop in close proximity to the ground surface 25, as shown in FIG. 27. Preferably, the pair of infeed wheels 76 are employed to maintain the infeed scoop in position, following the contour of the ground surface, to gather the scattered covering 28 of almonds 22 and associated debris 29 into the uptake conveyor. The uptake conveyor lifts and then deposits the scattered covering onto the separation conveyor 108 of the separation section 105.

Figure 26:
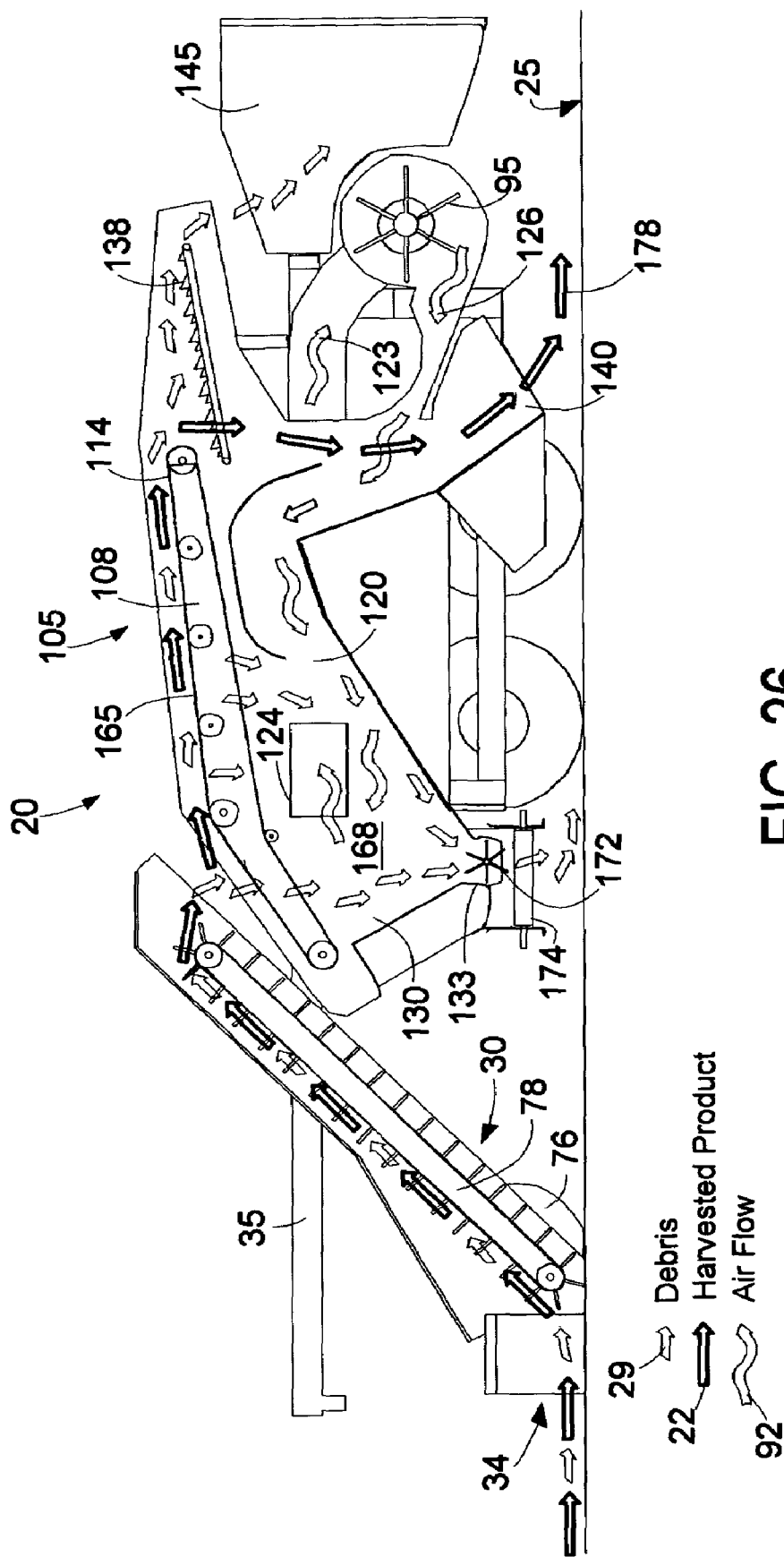
FIG. 26 is a sectioned side view of a conditioner apparatus, according to an embodiment of the invention.

As shown in FIG. 26, the separation conveyor 108 of the alternative embodiment of the conditioner 20, also includes the separation belt 114. Preferably, the separation belt is comprised of a meshed material 165 or "mesh." The mesh of the separation belt is preferably comprised of open, interlocking metal links, with the internal openings sized to retain the almonds 22 on the separation belt. Additionally, the mesh of the separation belt allows the airstream 92 to flow through, while allowing the debris to drop through the mesh of the separation belt. The product, which is almonds in this preferred embodiment, is retained on the separation belt and dropped into the nut hopper 140. Additionally, in this preferred embodiment, the nut hopper collects and funnels the product to the nut outlet 151, which dumps the product into the windrow 155, returning the almonds to the ground surface 25, behind the conditioner.

The separation conveyor 108 is enclosed within a separation plenum 120, as also shown in FIGS. 26 and 27. The separation plenum gathers or collects the debris 29 dropped from the separation belt 114. The separation plenum acts as the pollution control device 130, which in this preferred alternative embodiment is a settling chamber 168, in that the velocity of the airstream 92 slows in the separation plenum, relative to the higher velocity of the airstream across or through the separation belt of the separation conveyor. This slowing of air stream velocity causes finer particulate, which is a "dust and fines" 169, entrained in the higher velocity airstream, to settle out of the airstream and collect within the separation plenum. The dust and fines collect into the dropout 133, near the bottom of the separation plenum, which acts as a hopper for the collection of the dusts and fines. The dropout provides an outlet for the removal of the dusts and fines that settle out of the separation plenum.

Figure 25:
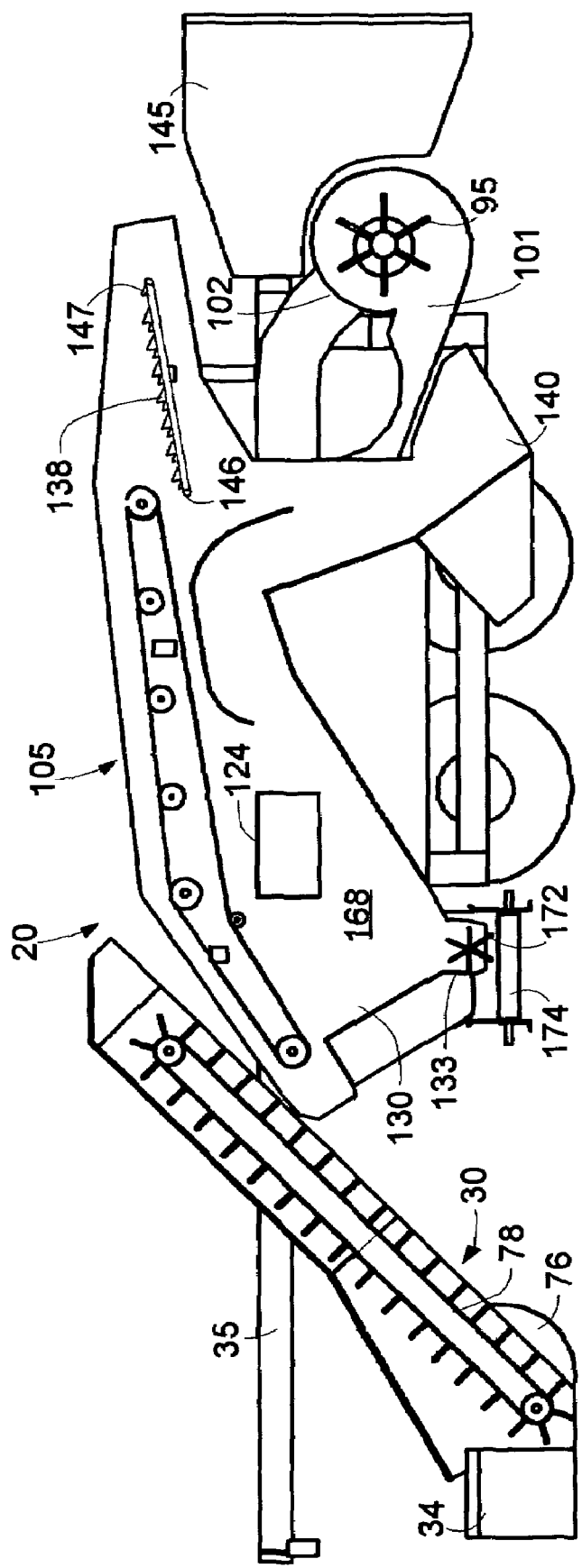
FIG. 25 is a sectioned side view of a conditioner apparatus, according to an embodiment of the invention.

As shown in FIG. 25, a rotary valve 172 is preferably employed to induce and meter the flow of the dust and fines 169 from the dropout 133 of settling chamber, at the bottom of the separation plenum 120. The rotary valve also acts as an airlock to prevent the introduction of air into the separation plenum. The rotary valve is a standard mechanism, typically utilized for the controlled and substantially airtight withdrawal of a fine material from hoppers or similar containers. A debris conveyor 174 is then employed to transport the dust and fines away from the conditioner 20, as detailed in FIG. 27. The debris conveyor preferably deposits the dust and fines outside the track of the conditioner, and well separated from the windrow 155 of almonds 22, which is deposited to the rear of the conditioner. The debris conveyor is preferably an endless belted conveyor, as shown. However, any similar acting conveyance, such as an enclosed gathering screw or auger mechanism could be employed as an alternative.

For the generation of the airstream 92 within the conditioner 20, a conditioner fan 95 is used. Preferably, the conditioner fan is a standard, industrial quality, high volume blower. The blower is preferably selected to generate sufficient air flow to dislodge the dust and fines 169 from the separation conveyor 108, and to maintain a reasonably high static pressure within the separation plenum 120. The optimum fan size and power would be readily selectable by a person skilled in fan and fan motor selection. A most preferred conditioner fan for this embodiment is a model "911," with a 19.13 inch diameter industrial radial blade fan (paddle wheel), which generates approximately 4,657 CFM, at 5 inches w.g. of static, 2500 RPM and 14 BHP, as manufactured by Twin City Fan & Blower Co. of Minneapolis, Minn., U.S.A.

The conditioner fan 95 or simply the "fan" is preferably positioned as shown in FIGS. 25 through 27, and includes a "supply side," referred to herein as the conditioner fan supply 101, and a "suction side," referred to herein as the conditioner fan return 102. The separation air return duct 121 connects to the separation plenum 120 at the separation outlet 124, which is preferably located on the sidewall of the separation plenum, as shown in FIGS. 25 through 27. The separation air return duct routs from the separation outlet to the suction side of the fan, at the conditioner fan return. The separation air return duct pulls the separation suction airstream 123 from the separation plenum, as shown in FIG. 26.

Additionally, for this preferred alternative embodiment, the supply air duct 127 routes the supply airstream 126 generated from the conditioner fan 95, to the separation plenum 120. The supply air duct connects the conditioner fan supply 101 to the separation plenum at the separation inlet, which is also referred to herein as the "hopper supply air inlet" 158. The separation air supply routs from the conditioner fan supply 101 to the separation plenum.

Preferably, from the separation conveyor 108, the processed material stream 80 is fed to the walker assembly 138. At this pont in the conditioner 20, lighter dust and particulate materials have been removed from the processed material stream either as the dropout material 134 from the conditioner pollution control device 130, or as the as the fallout 125 that passes through the mesh of the separation belt 114. The only debris 29 processed material stream that remains is the almonds 22, and a large debris 139, such as sticks and twigs. In the walker assembly, the sticks and twigs are retained, while the almonds fall through to the nut hopper 140, positioned below the walker assembly, as shown in FIG. 27.

The remaining large debris 139, retained in the walker assembly 138, is dumped into the trash bin 145. As shown in FIGS. 25 and 27, the walker assembly includes the walker infeed end 146, that receives the processed material stream 80, and a walker discharge end 147, that dumps the large debris into the trash bin. The trash bin is removable and can be easily emptied and replaced when full.

A cleaned product 178, discharges from the separation plenum 120, as shown in FIG. 26 and 27. For this alternative preferred embodiment of the invention, this cleaned product is the almonds 22, with the debris 29 removed. The separation plenum includes a nut outlet 151, which is a chute for funneling the cleaned product to the ground surface 25 in a continuous stream to form the windrow 155. Windrow formation is the preferred processing technique for tree nuts, such as almonds. The windrow of almonds are left to dry in the windrow for a short period of time, after which the windrow is retrieved and the almonds are husked, shelled, and packed or shipped.

Harvester

Figure 16:
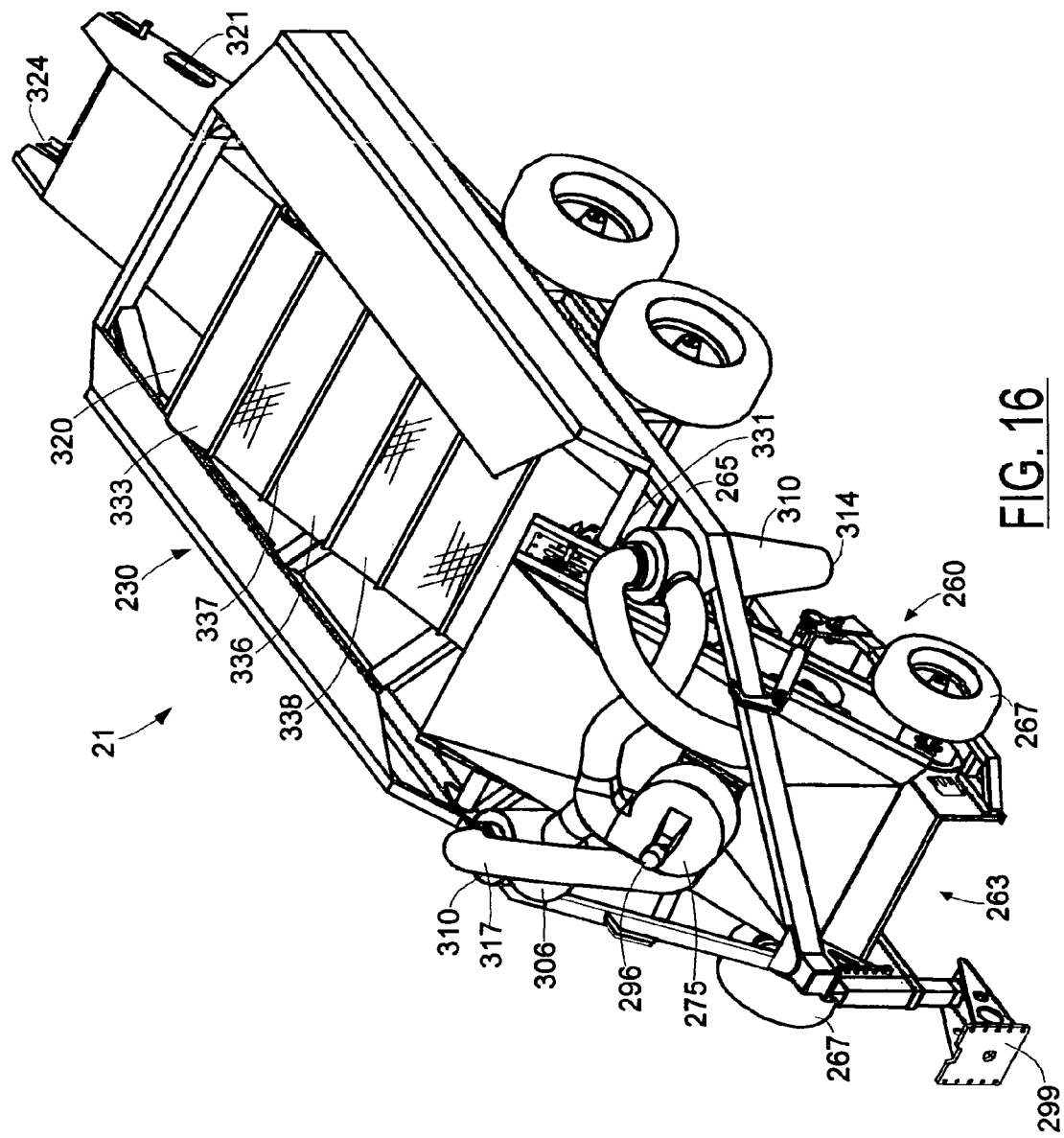
FIG. 16 is a perspective view of a harvester apparatus, according to an embodiment of the invention.
Figure 17:
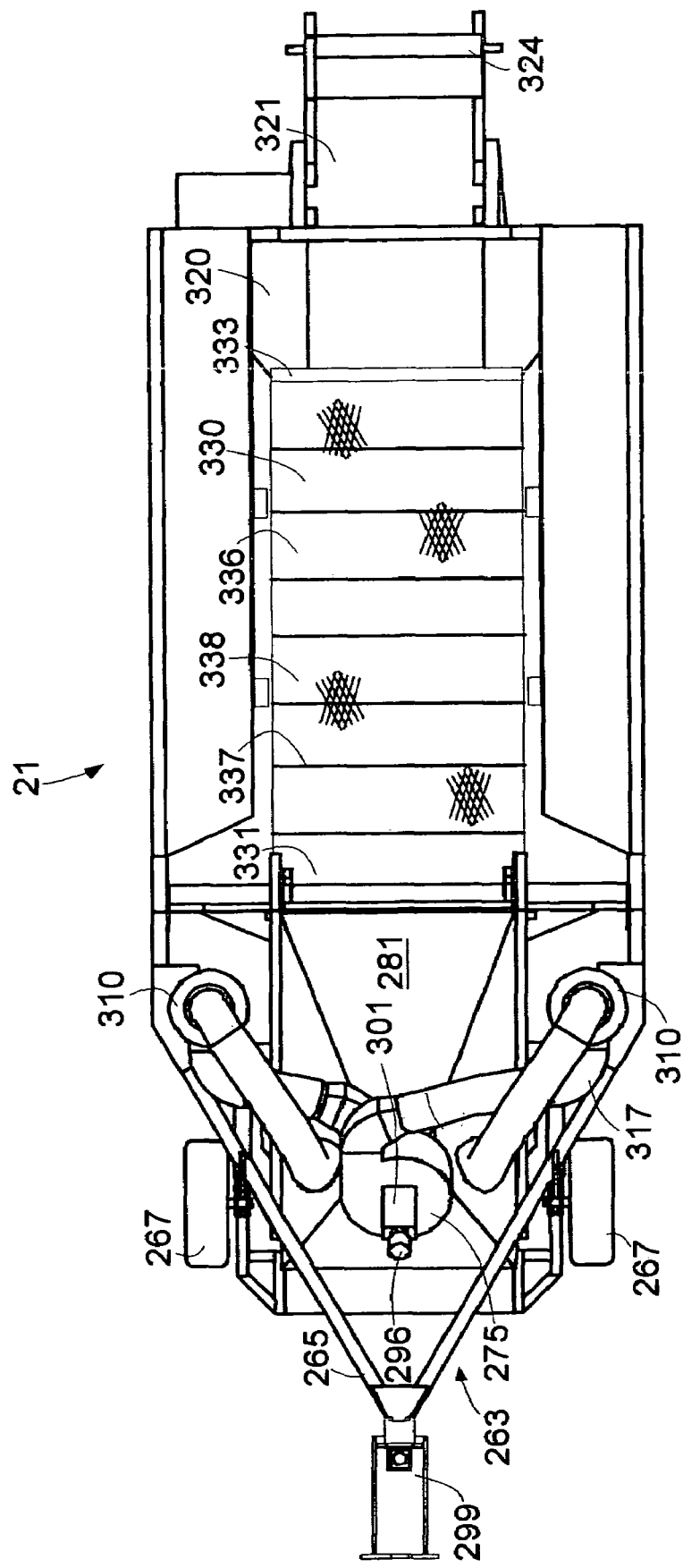
FIG. 17 is a top view of a harvester apparatus, according to an embodiment of the invention.
Figure 18:
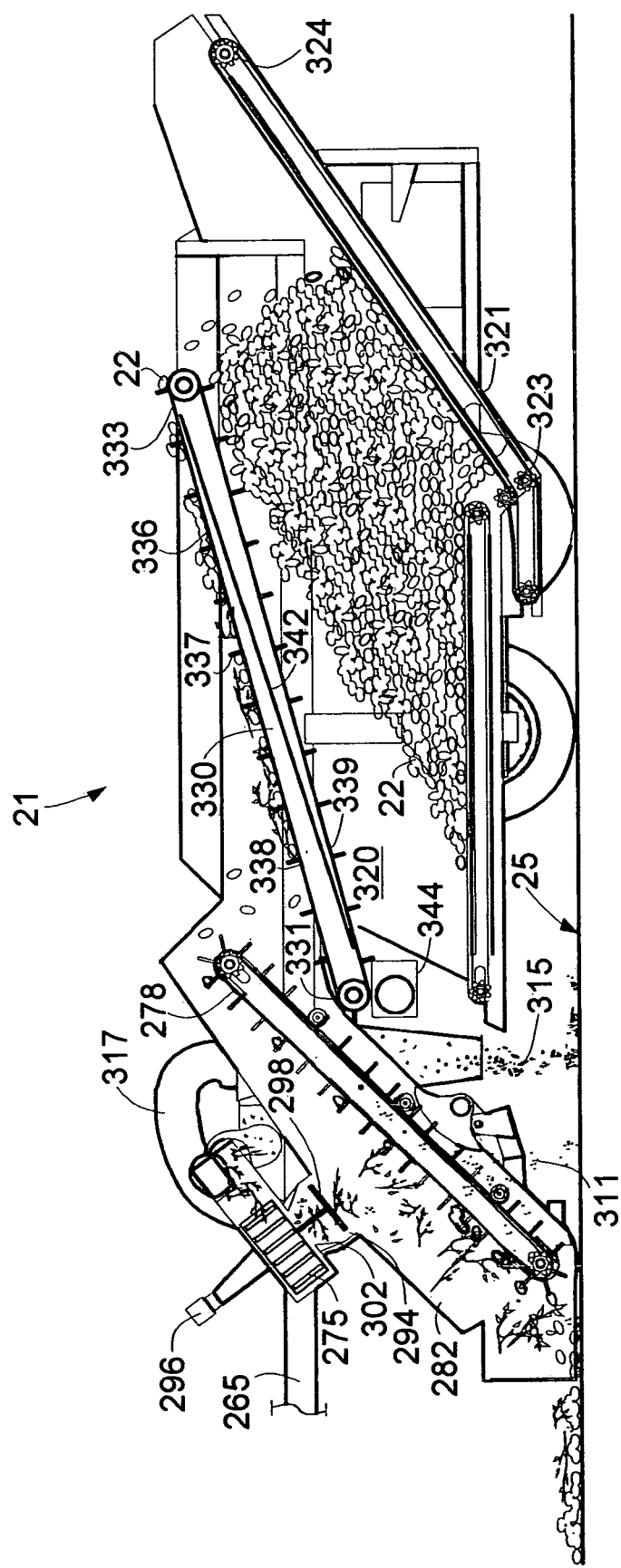
FIG. 18 is a partially sectioned side view of a harvester apparatus, according to an embodiment of the invention.
Figure 19:
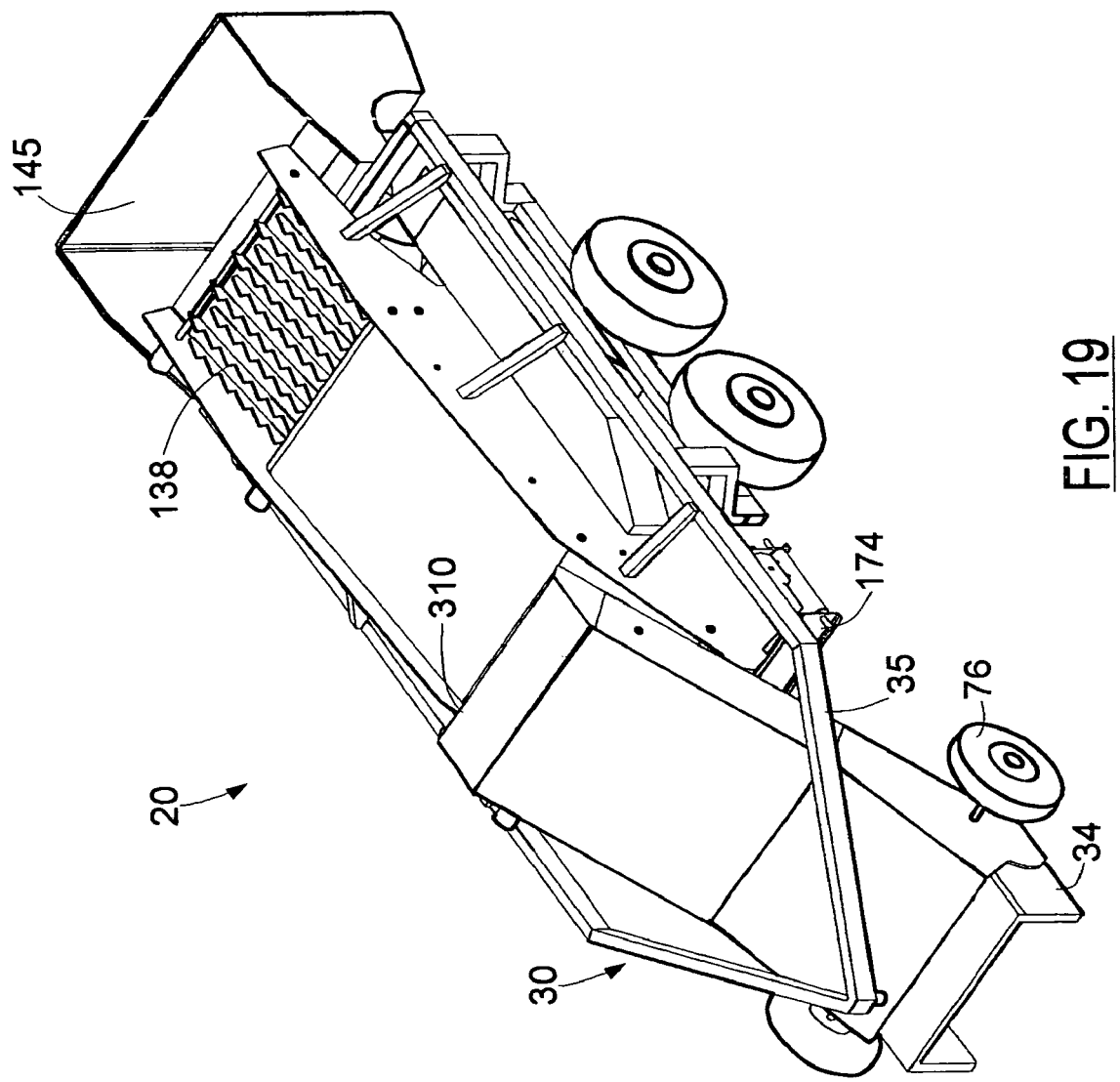
FIG. 19 is a perspective view of a conditioner apparatus, according to an embodiment of the invention.
Figure 20:
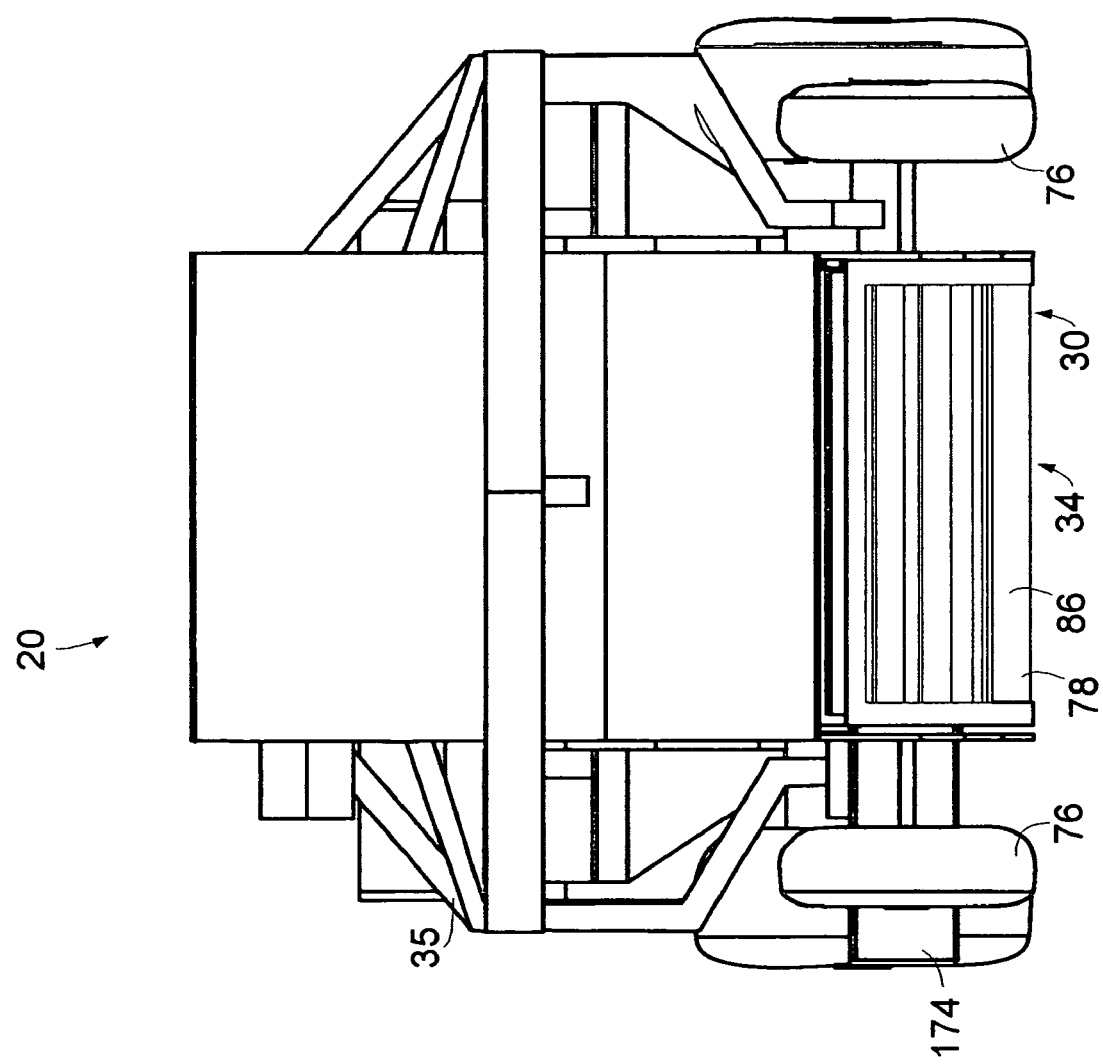
FIG. 20 is a front end view of a conditioner apparatus, according to an embodiment of the invention.
Figure 21:
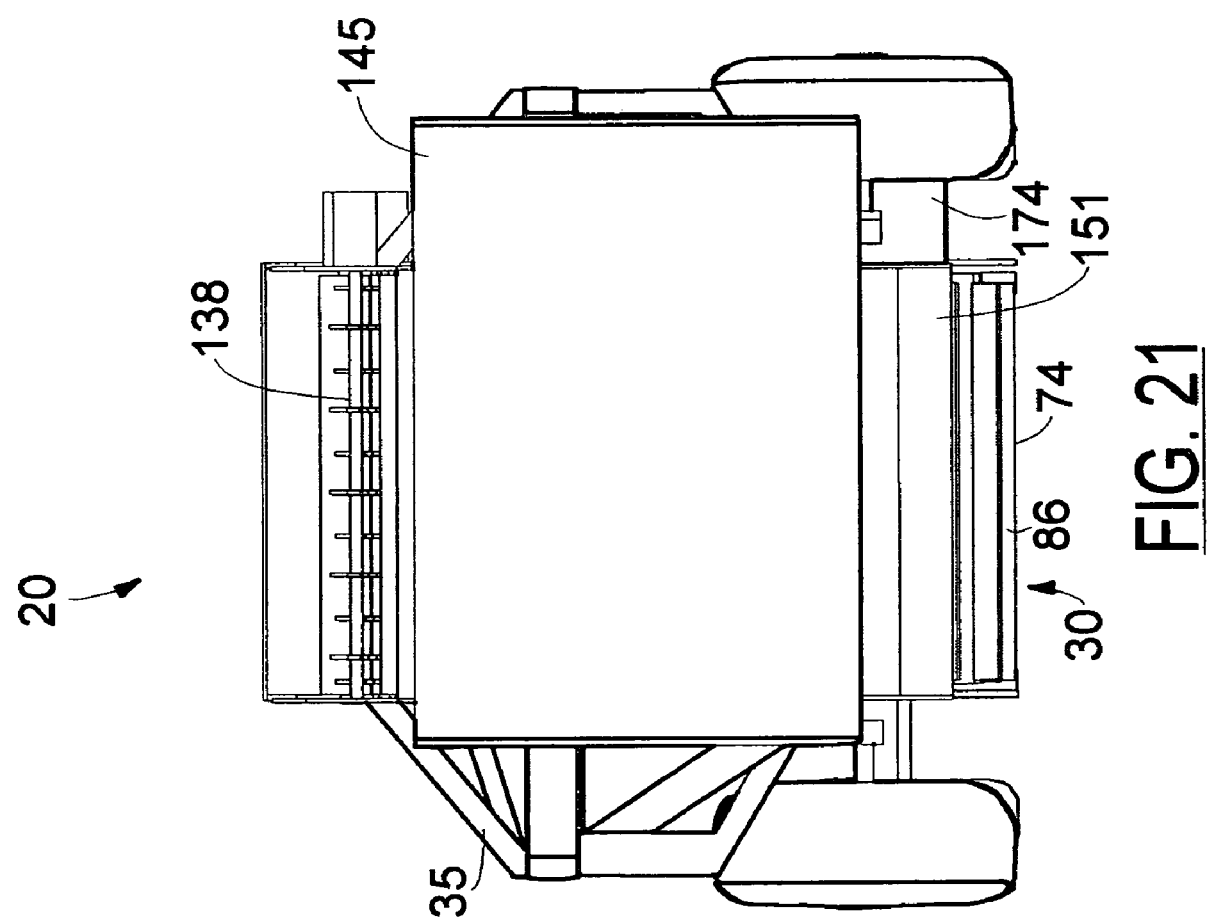
FIG. 21 is a rear end view of a conditioner apparatus, according to an embodiment of the invention.
Figure 22:
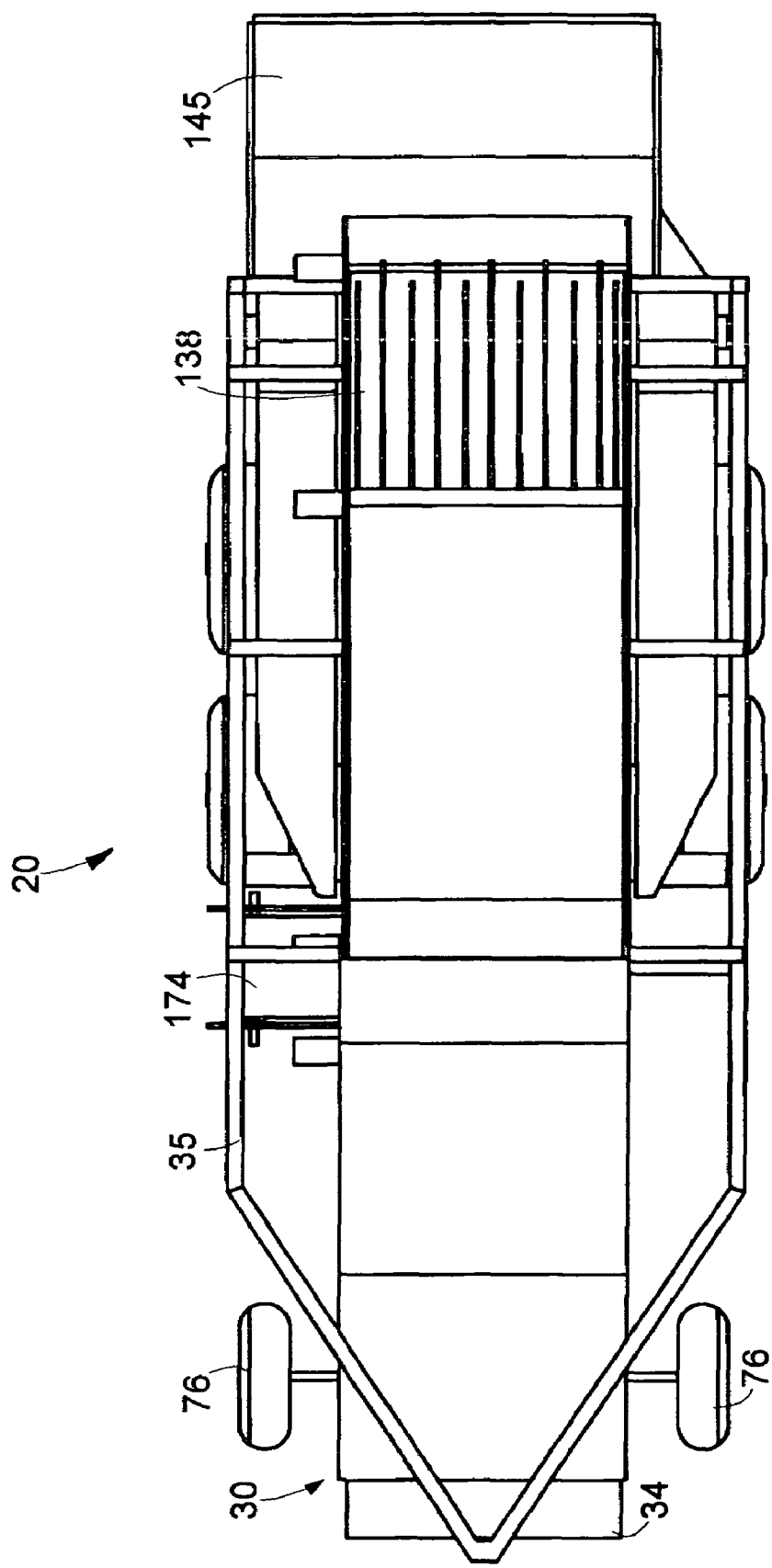
FIG. 22 is a top view of a conditioner apparatus, according to an embodiment of the invention.

A preferred embodiment of the harvester 21 is detailed in FIGS. 9 through 15. One alternative preferred embodiment of the harvester is shown in FIGS. 16 through 18, and another preferred embodiment of the harvester is shown in FIGS. 28 through 34. Generally, the harvester is configured to follow the initial processing by the conditioner 20.

Figure 10:
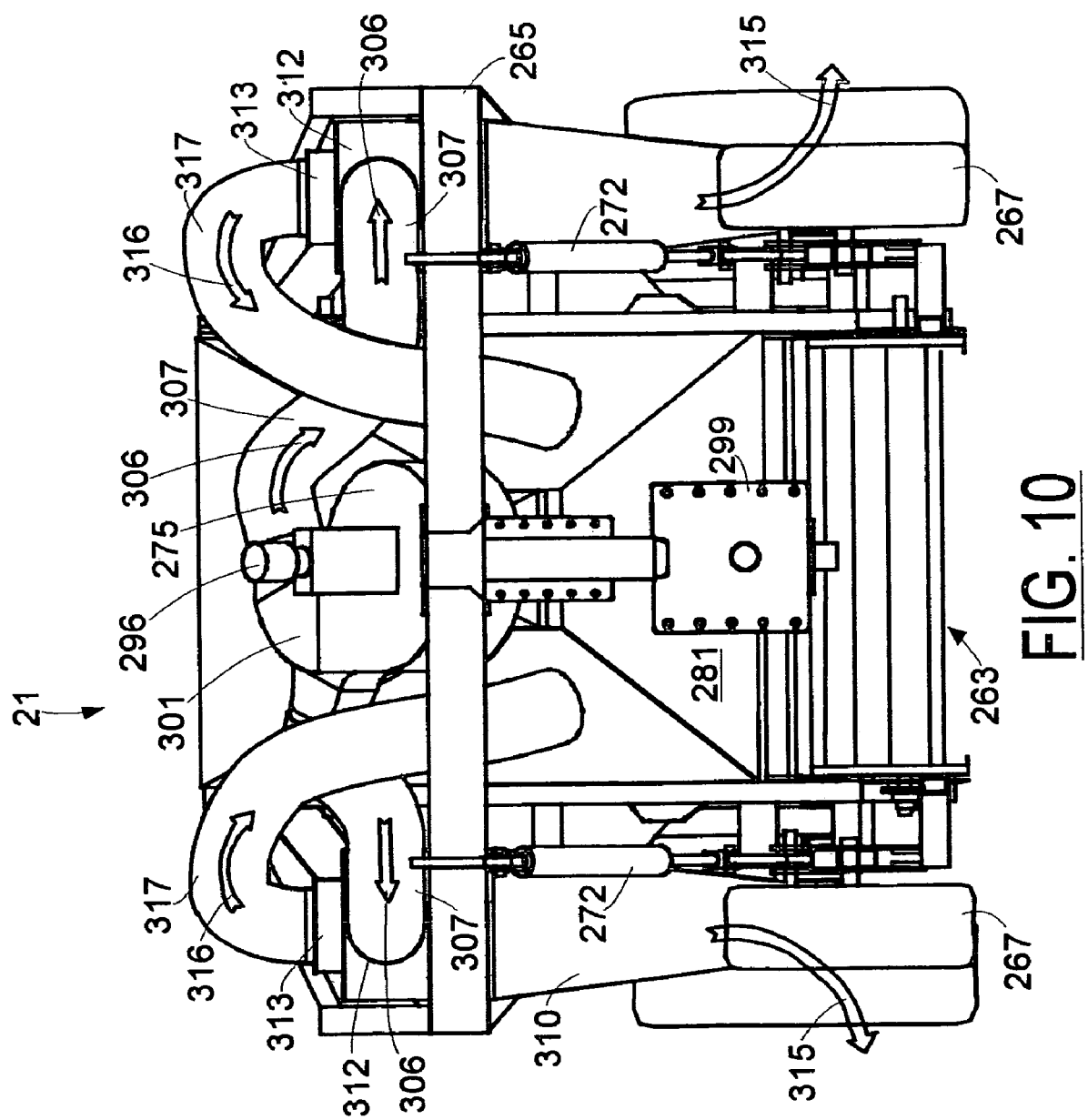
FIG. 10 is a front end view of a harvester apparatus, according to an embodiment of the invention.
Figure 11:
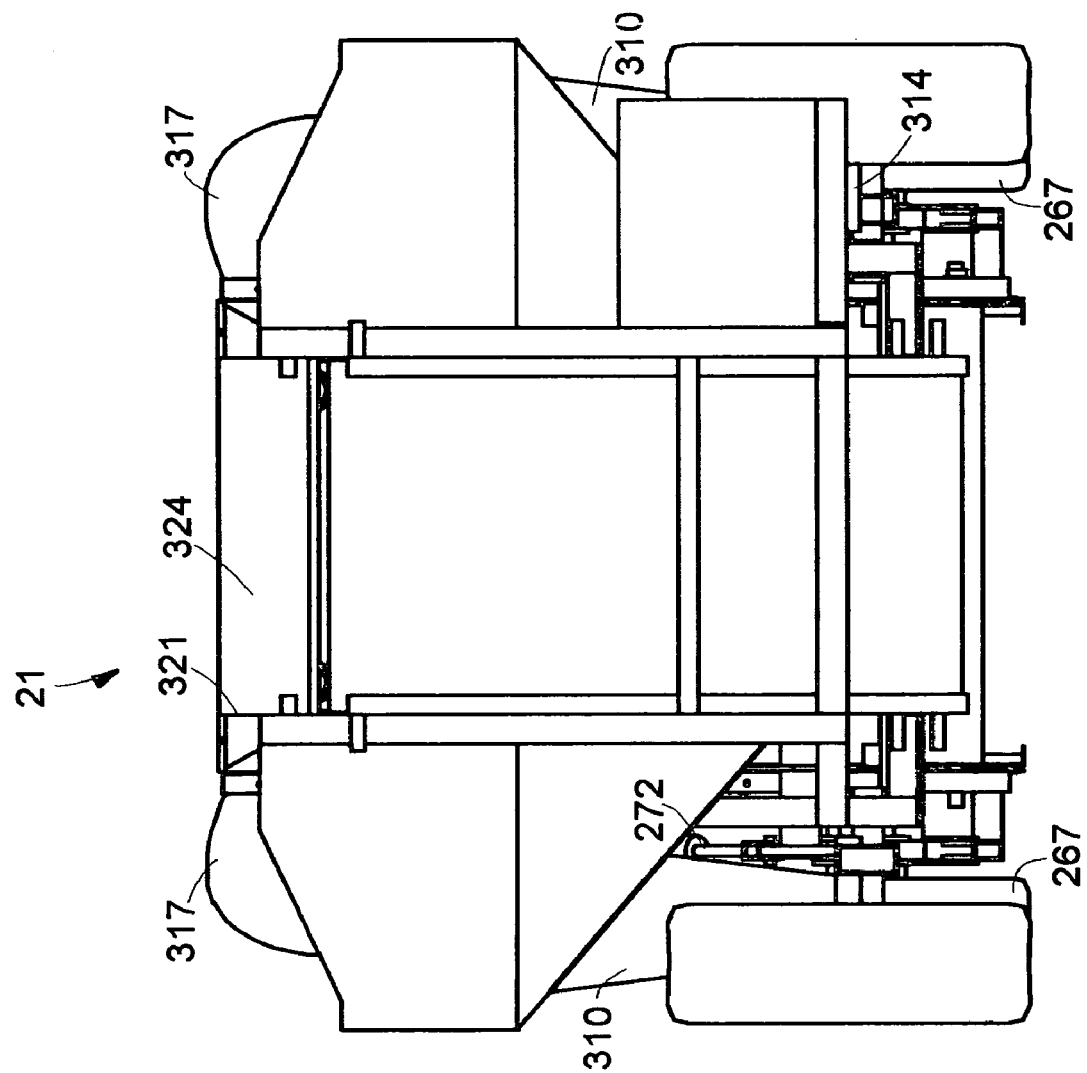
FIG. 11 is a rear end view of a harvester apparatus, according to an embodiment of the invention.
Figure 12:
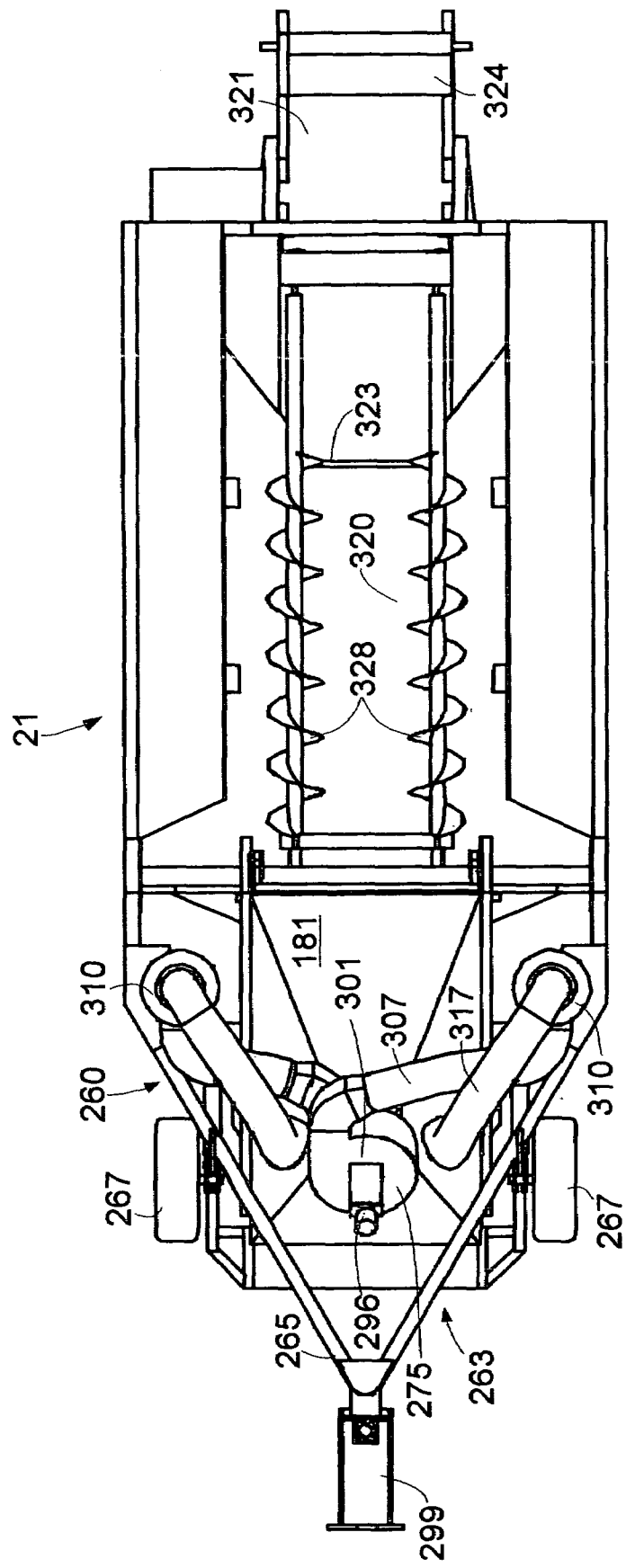
FIG. 12 is a top view of a harvester apparatus, according to an embodiment of the invention.
Figure 13:
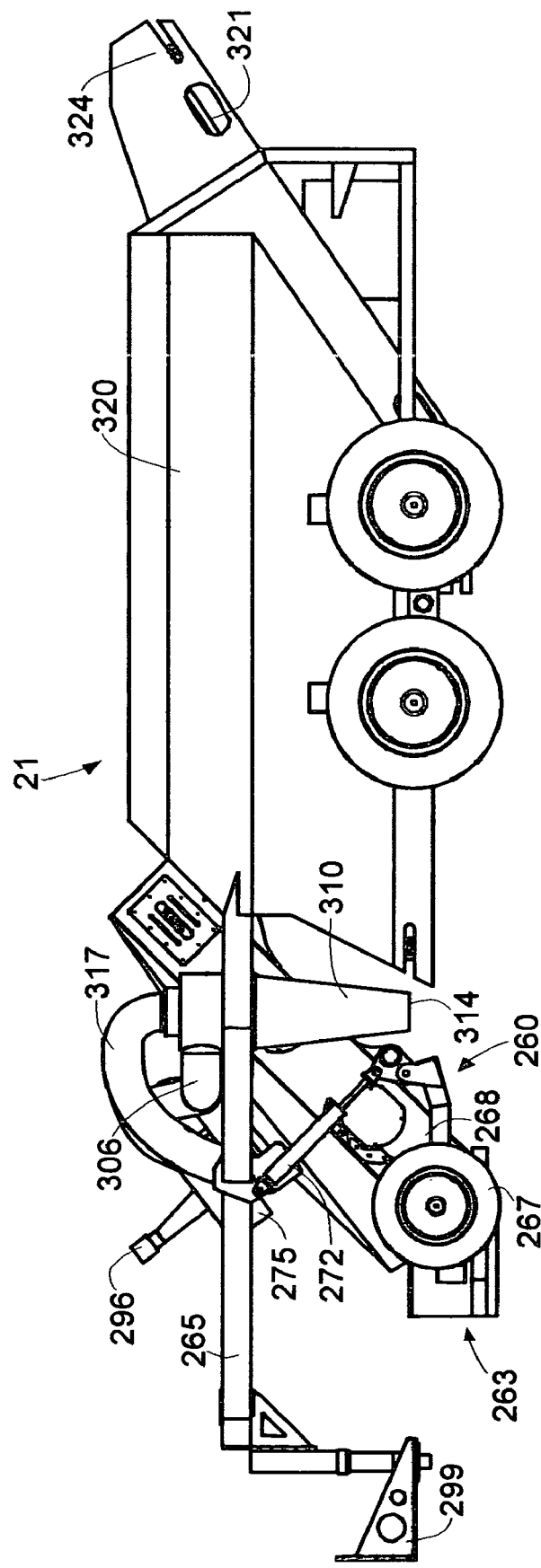
FIG. 13 is a side view of a harvester apparatus, according to an embodiment of the invention.
Figure 15:
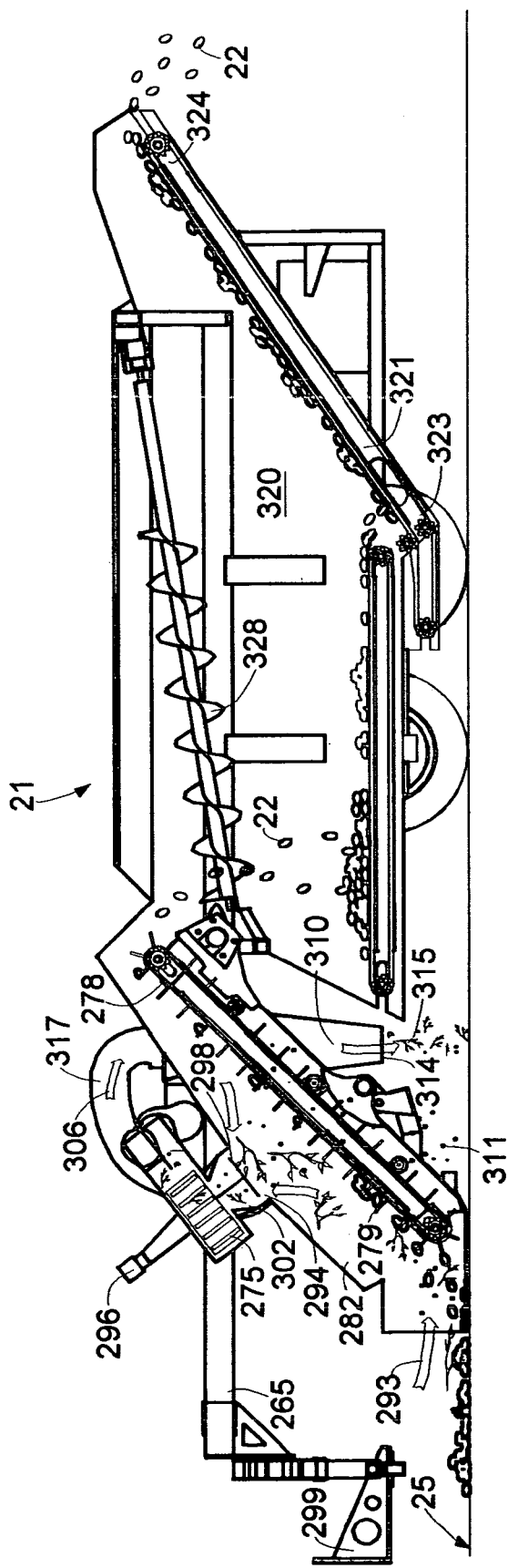
FIG. 15 is a partially sectioned side view of a harvester apparatus, according to an embodiment of the invention.

As described above, the operation of the conditioner 20 results in the production of the windrow 155 of almonds 22, mounded on the ground surface 25 as shown in FIG. 15. After the windrow of almonds is properly dried and ready for retrieval, the harvester 21 is employed to collect the windrow. To accomplish this task, he harvester 21 employs a windrow uptake section 260, as shown in FIG. 10. The windrow uptake section is similar to the uptake section 30 of the conditioner 20, and includes a windrow infeed scoop 263. Like the conditioner apparatus, the harvester apparatus of the present invention is preferably modular in design, with components mounted on a harvester frame 265.

By contrast to the harvester 21, the uptake section 30 of the conditioner 20 additionally included the sweeper array 33, which is not required in the harvester. The windrow uptake section 260 of the harvester need only address the consolidated windrow 155, rather than the carpet 28 of almonds, and so does not require the sweeping mechanism.

In a preferred embodiment of the harvester 21, the windrow scoop 263 can also include a pair of windrow wheels 267, to maintain and track the windrow scoop with the ground surface 25. The windrow scoop gathers the windrow 155, as processed and consolidated by the conditioner 20, for feeding into a harvesting conveyor 268. The harvesting conveyor extends from the harvester frame 265 and terminates with the windrow scoop. The consolidated windrow and debris 29, when gathered into the windrow scoop and picked up by the harvesting conveyor, can now be referred to as a harvested material stream 270.

Figure 9:
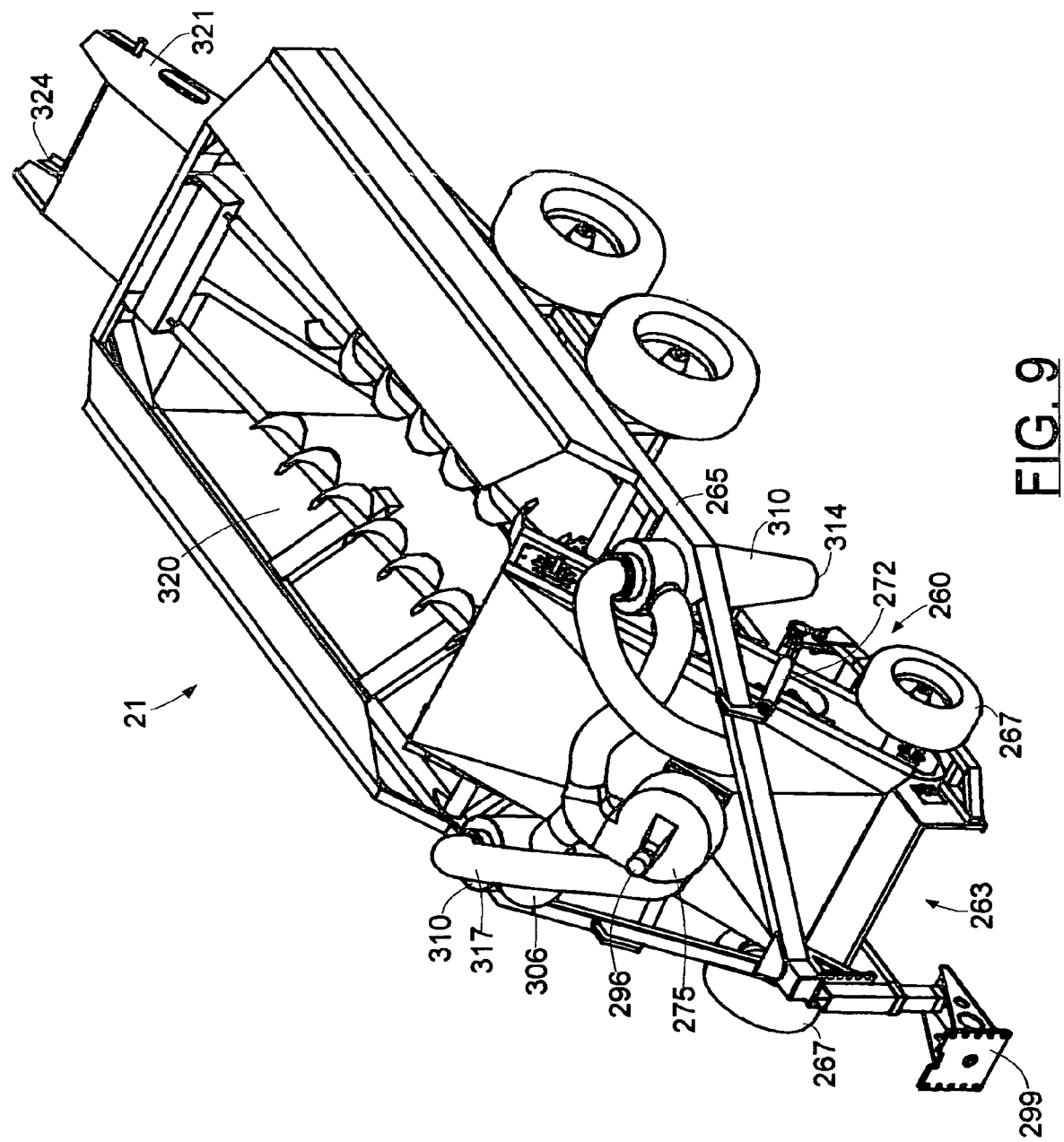
FIG. 9 is a perspective view of a harvester apparatus, according to an embodiment of the invention.

Preferably, the windrow scoop 263 and the attached harvesting conveyer 268 can be raised or lowered by action of a harvester conveyor actuator 272. The harvester conveyor actuator, as shown in FIG. 9 can alternatively raise or lower the windrow scoop and attached harvesting conveyor. The raised position is desirable for quick travel, and adjustment to the lowered position needed for best tracking along the ground surface 25.

Because, the windrow 155 of almonds 22 typically includes some debris 29 that has gathered during the windrow's drying period, or naturally surrounds the windrow on the orchard floor or ground surface 25, the harvester 21 of the present invention includes a harvester fan 275 to remove the debris from the harvested material stream 270.

The harvesting conveyer 268 transfers the harvested material stream 270, up and into the harvester 21. The harvesting conveyor preferably includes a conveyor belt 278, which is equipped with conveyor flights 279, as shown in FIG. 15. The conveyor flights, like the uptake flights 86 on the uptake belt 84 in the conditioner 20, most preferably, are parallel slats of metal, in combination with rubber. The uptake flights serve to prevent the harvested material stream from falling, back toward the windrow scoop 263 and the ground surface 25. The conveyor belt is preferably an open, metal mesh, sized to retain the almonds 22 on the conveyor belt. The conveyor belt is also sized and configured to provide strength, while allowing air to flow up through it, and allow debris 29 to drop down out of it. The harvesting conveyer is covered by a conveyor cover 281, which forms a conveyor plenum 282 over the conveyor belt.

As shown in FIG. 15, a suction duct 291 connects to the conveyor plenum 282, to pull a suction airstream 293, up through the windrow scoop 263, across the conveyor belt 278, and through the conveyor plenum. The suction duct connects to the conveyor cover 281 of the conveyor plenum at a suction outlet 294. The harvester fan 275 pulls the suction airstream from the conveyor plenum through the suction outlet. A centrally located, singular suction outlet is preferably employed as shown in FIG. 15, to provide for evenly distributed flow across the conveyor plenum.

As shown in FIG. 15, a breaker blade 298 is preferably employed within the suction duct 291. The breaker blade is most preferably a conventional rotary type of blade, affixed to the harvester fan 275. The breaker blade serves to break-up any large debris 139 that is picked up with the windrow in the harvested stream, such as twigs, sticks and small branches.

As with the uptake plenum 90 and the separation plenum 120 of the conditioner 20, the conveyor plenum 282 of the harvester 21 is much smaller than the plenums of prior nut collecting devices. The relatively small conveyor plenum provides for a controlled and high velocity airstream directed through the conveyor plenum. The suction airstream 293 is substantially homogenous throughout the conveyor plenum, and a strong suction is attained with a minimum of total air flow. Again, this provides for an operational economy by reducing the requisite fan size and by reducing the air filtration necessary to remove the debris 29, entrained in the suction airstream.

The suction airstream 293 is pulled from the conveyor plenum 282 and routed to the harvester fan 275, powered by a harvester fan motor 296. Like the conditioner fan 95, the harvester fan is preferably a conventional centrifugal fan, sized to serve the air movement need of the present invention. For a preferred embodiment of the harvester 21, as shown in FIG. 15, a harvester fan with a centrifugal, backward inclined blade type of fan blower, rated to deliver an approximate air flow of 2,000 CFM, at 1 inch static pressure, when driven with a 15 to 20 BHP motor, is well suited for the present invention. However, any fan, suited to industrial use with the desired performance characteristics, could be utilized. The harvester fan motor is most preferably hydraulic, to deliver approximately 15 HP.

Figure 14:
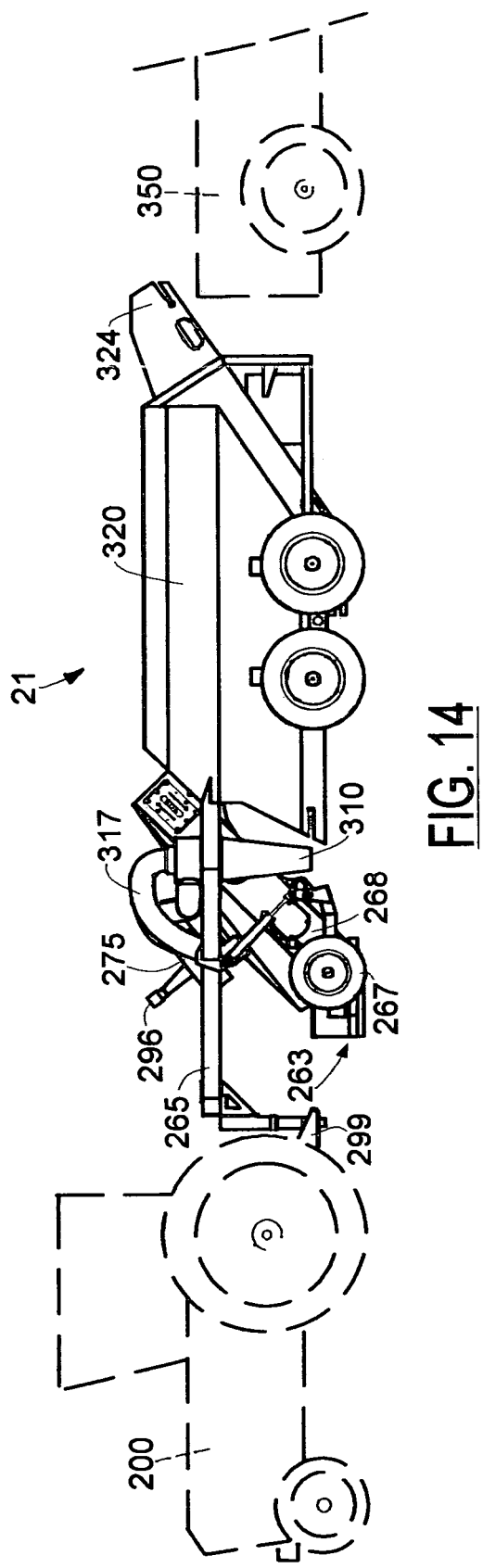
FIG. 14 is a side view of a harvester apparatus, according to an embodiment of the invention.

A central hydraulic pump can be placed on the harvester frame 265 to supply high pressure hydraulic fluid for actuating all powered elements of the harvester 21. The harvester can be configured as a towed trailer, with a hitch 299, as shown in FIGS. 9 and 10. The hitch attaches to the tractor 200, as shown in FIG. 14. Alternatively, the harvester can be configured as a self-propelled apparatus, similar in drive and control configuration to the embodiment of the conditioner 20 shown in FIGS. 1 through 6.

The harvester fan 275 has a harvester fan supply 201 and a harvester fan return 202. The uptake air return duct 91 connects the uptake plenum 90 to the return of the fan. As shown in FIG. 10, the fan return duct connects to the windrow uptake section 260 of the harvester 21.

Within the harvester 21, the suction airstream 293 is pulled from the conveyor plenum 282 and routed to the harvester fan return 202. Most preferably, as discussed above, the suction duct 291 is employed to collect the debris 29 under suction, through the suction outlet 294 of the conveyor plenum. Alternatively, as in the conditioner 20, a multiple of suction inlets could be used, each connected to different portions of the conveyor cover 281, or more generally to service any portion of the conveyor plenum.

The harvester fan 275 generates a conveyor supply air stream 206, through a conveyor supply air duct 207. The conveyor supply air duct connects to the harvester fan supply 201. The conveyor supply air duct can be a multiple of supply air ducts, a single conveyor supply air duct, or preferably, as shown in FIG. 10, a single conveyor supply air duct that branches with a conventional Y-duct, with each branch or "leg" of the duct routed to a harvester pollution control device 310.

Most preferably, for the harvester 21 of the present invention, the harvester pollution control device 310 is a cyclone, as shown in FIG. 9. The cyclone includes a cyclone inlet 312, a harvester supply air outlet 313, and a harvester dropout 314. The cyclone is of conventional design, and can include baffles, mini-cyclones, filters or any such mechanisms for entraining, knocking out, or settling out debris 29 carried by the supply air stream into the harvester pollution control device. Similar in function to the conditioner air pollution control device 130, the particulate debris that settles out of the harvester pollution control device, exits from the dropout as harvester dropout 314. Alternatively, the cyclone could be any air pollution control device known those skilled in the field of particulate removal from an airstream. Typical selections of an air pollution control device include media filters, electrostatic filters, baffles, settling chambers, or any such mechanisms for entraining, knocking out, or settling out the debris carried by the conveyor fan supply air stream 206 into the harvester pollution control device.

A cleaned conveyor supply airstream 316 exits through a cleaned conveyor supply air duct 317. The cleaned conveyor supply airstream is distributed into the windrow uptake section 260 of the harvester 21. Specifically, as shown in FIG. 10, the cleaned conveyor supply air duct connects the harvester supply air outlet 313 of the harvester air pollution control device 310 to the conveyor cover 281. It is observed that instead of discharging the cleaned airstream to the atmosphere, as typical of prior devices, the cleaned conveyor airstream is re-used by the harvester. Again, in a preferred embodiment of the conditioner, two cleaned conveyor supply air ducts are utilized, one routed from each of the two cyclone air pollution control devices.

From the harvesting conveyor 268, the harvested material stream 270 is fed to a transport bin 320. At this pont in the harvester 21, lighter portion of fractions of the debris 29, such as leaves, branches, trash, and some dust and particulate materials have been removed from the harvested material stream by the action of the windrow uptake section 260 and the suction airstream 293. Additionally, the dust and fines 169, which tend to be the finer and less aerodynamic fraction of the debris, fall through the mesh of the conveyor belt 278, as harvester fallout 311. In the transport bin, the almonds 22 are retained, preferably until the transport bin is full and ready to be emptied.

As shown in FIG. 15, the transport bin 320 preferably includes a loadout conveyor 321. The loadout conveyor has a loadout feed end 323 within the transport bin and a loadout discharge end 324 located outside the transport bin. The loadout conveyor is preferably a conventional, endless belt type of conveyor that removes the almonds 22 from the bottom of transport bin to the discharge end, which is preferably located proximate to the rear of the harvester 21. A loadout auger 328 aids in the discharge of the almonds from the transport bin. In a most preferred embodiment of the harvester, a pair of the loadout augers are employed to move the almonds onto the loadout conveyor to remove the almonds from within the transport bin.

First Alternative Harvester

In an alternative preferred alternative embodiment of the harvester 21, as shown in FIGS. 16 through 18, the transport bin 320 of the harvester may include a shaker conveyor 330. The shaker conveyor receives the harvested material stream 270 from the harvesting conveyor 268. Although lighter dust and materials, such as branches, twigs and trash have been removed from the harvested material stream, there may still be heavier debris 29 present in the material stream, such as gravel and dirt. The shaker conveyer includes a shaker feed end 331 that slopes up to a shaker discharge end 333. The harvested material stream falls from the harvesting conveyor 268 onto the shaker conveyor at the shaker feed end.

The shaker conveyor 330 has features of a conventional shaker table and material moving features of a conveyor belt. The shaker conveyor includes a shaker belt 336, with shaker flights 337. The shaker belt receives the harvested material stream 270 on a upper shaker belt portion 338, at the shaker feed end 331. The upper belt travels toward the shaker discharge end and then returns below as a lower shaker belt portion 339, back to the shaker feed end. The shaker belt is preferably a wide mesh that is sized to retain the almonds 22 but allow debris 29 to pass through it. The shaker conveyor also includes a debris tray 342 that directs any debris falling through the shaker belt, down the length of the shaker conveyor, discharging the debris, which is a harvester fallout 311, at the shaker infeed end and onto the ground surface 25, as shown in FIG. 18.

A shaker motor 344 provides the shaking or vibrating action to the shaker conveyor 330. This shaker motor is preferably hydraulic powered, and of a conventional design. The shaker conveyor is isolated, as is typical, to vibrate independently from surrounding structure, such as the transport bin 320 or the rest of the harvester 21.

As also shown in FIG. 18, the almonds 22 are retained on the shaker belt 336 up to the shaker discharge end 333. The almonds are then deposited into the transport bin 320. The shaker flights 337 on the lower shaker belt portion serve to level the almonds within the transport bin and push the almonds back toward the shaker feed end 331.

The shaker conveyor 330 is preferably substituted for the loadout auger 328, as shown in FIGS. 16 through 18, but could conceivably be utilized in addition to the loadout auger The almonds 22 are preferably retained within the transport bin 320 of the harvester 21 until the transport bin is full and ready to be emptied by action of the loadout conveyor 321.

As discussed above, the cleaned conveyor supply airstream 316 is recirculated air, removed from the windrow uptake section 260 of the harvester 21. By injecting the cleaned conveyor supply airstream into the conveyor plenum 282, positive air pressure is maintained within the conveyor plenum 282. This positive air pressure within the conveyor plenum greatly reduces intake of outside air by the windrow uptake section, and so prevents unwanted debris 29 from entering the harvester through the windrow scoop 263. The outfeed section includes an outfeed conveyor 318 that receives the processed material stream 80 from the uptake belt 84 of the uptake conveyor 78.

Second Alternative Harvester

Figure 23:
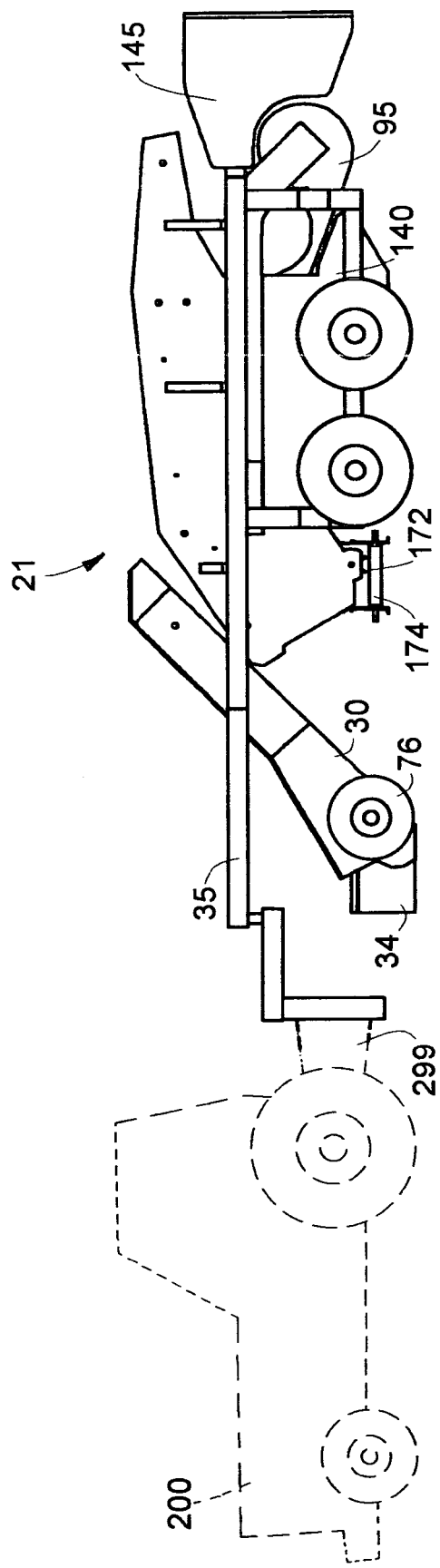
FIG. 23 is a side view of a conditioner apparatus, according to an embodiment of the invention.
Figure 24:
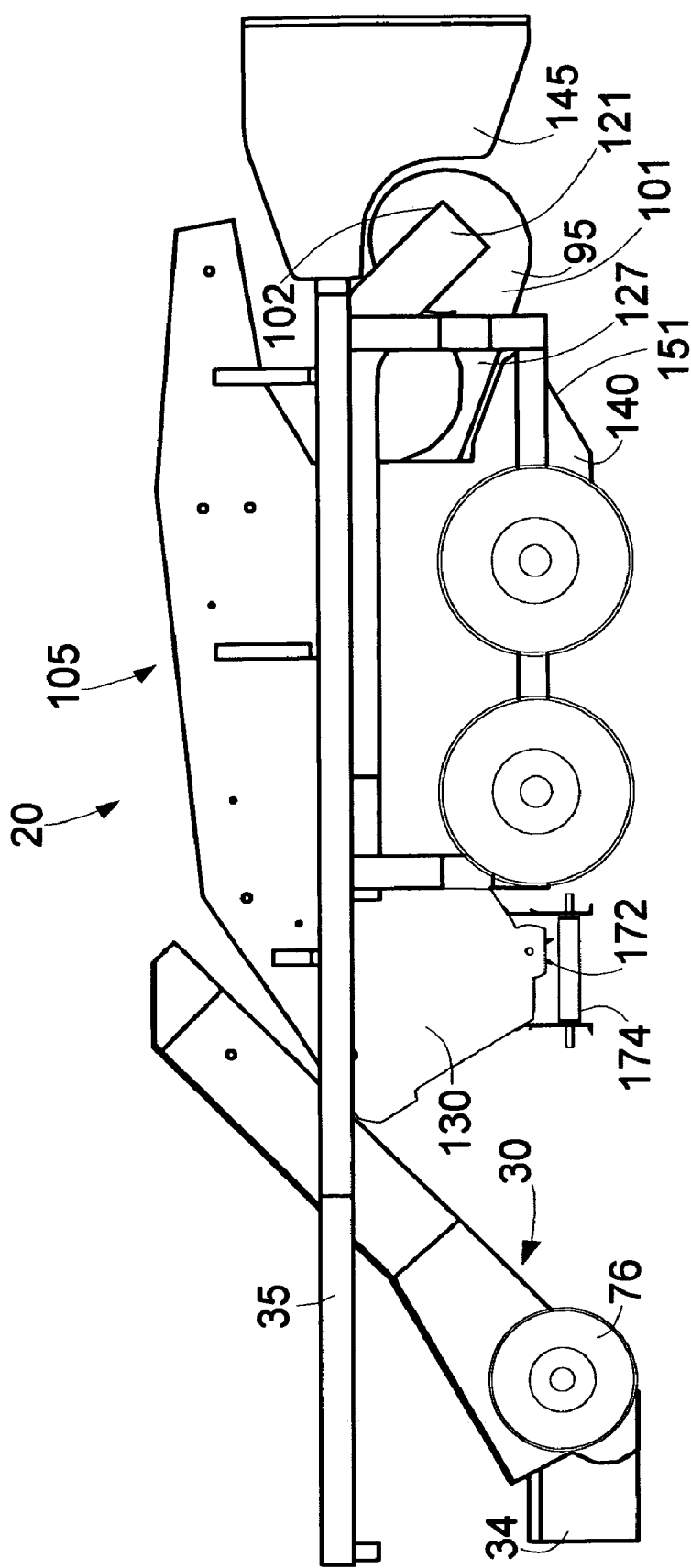
FIG. 24 is a side view of a conditioner apparatus, according to an embodiment of the invention.
Figure 32:
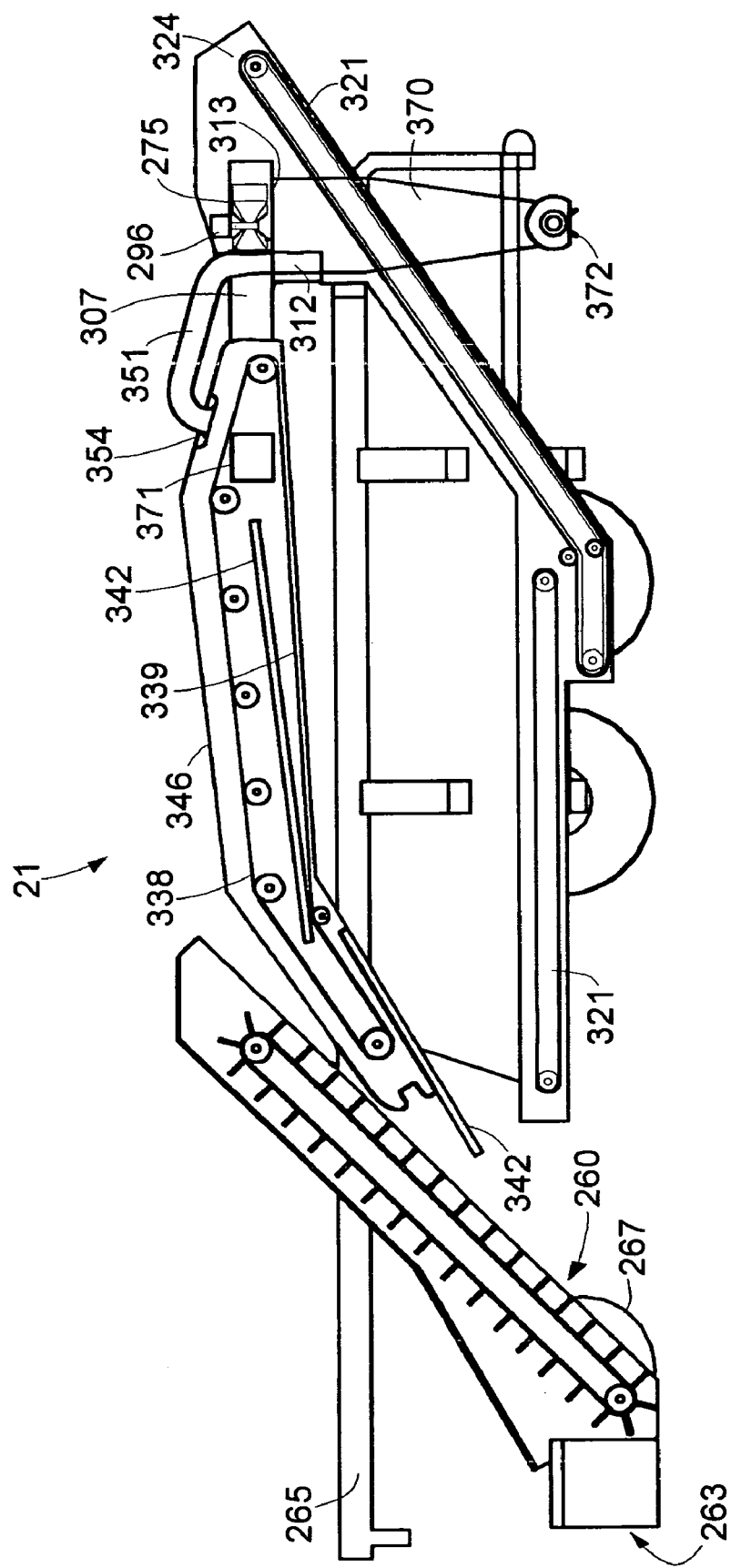
FIG. 32 is a sectioned side view of a harvester apparatus, according to an embodiment of the invention.
Figure 33:
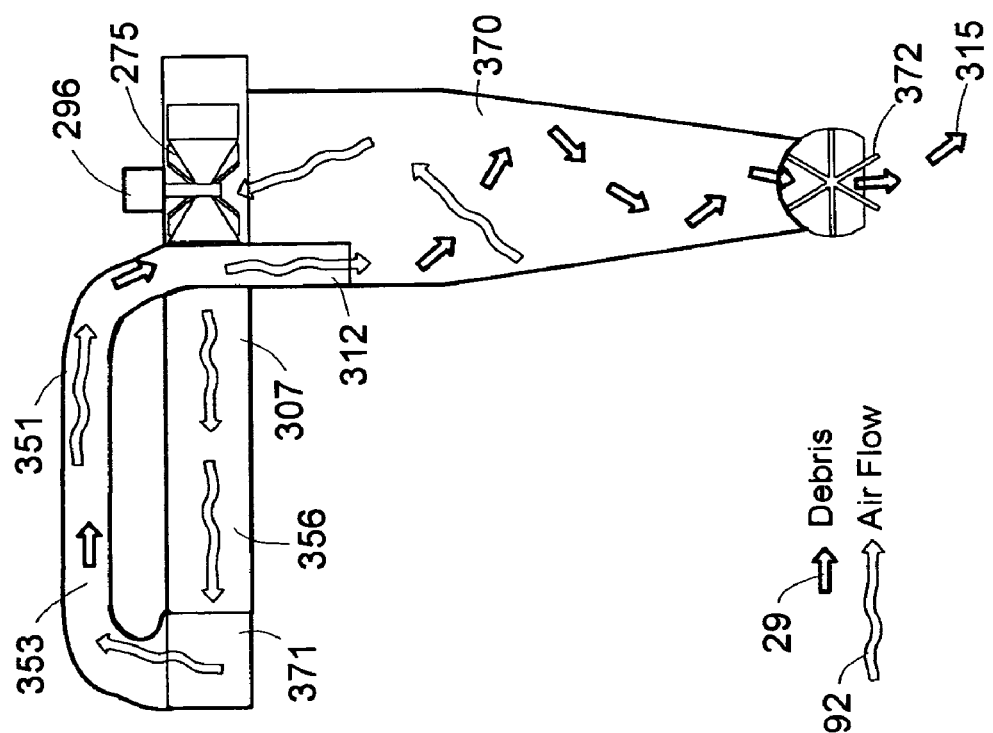
FIG. 33 is a detail of air flow through a portion of a harvester apparatus, according to an embodiment of the invention.
Figure 34:
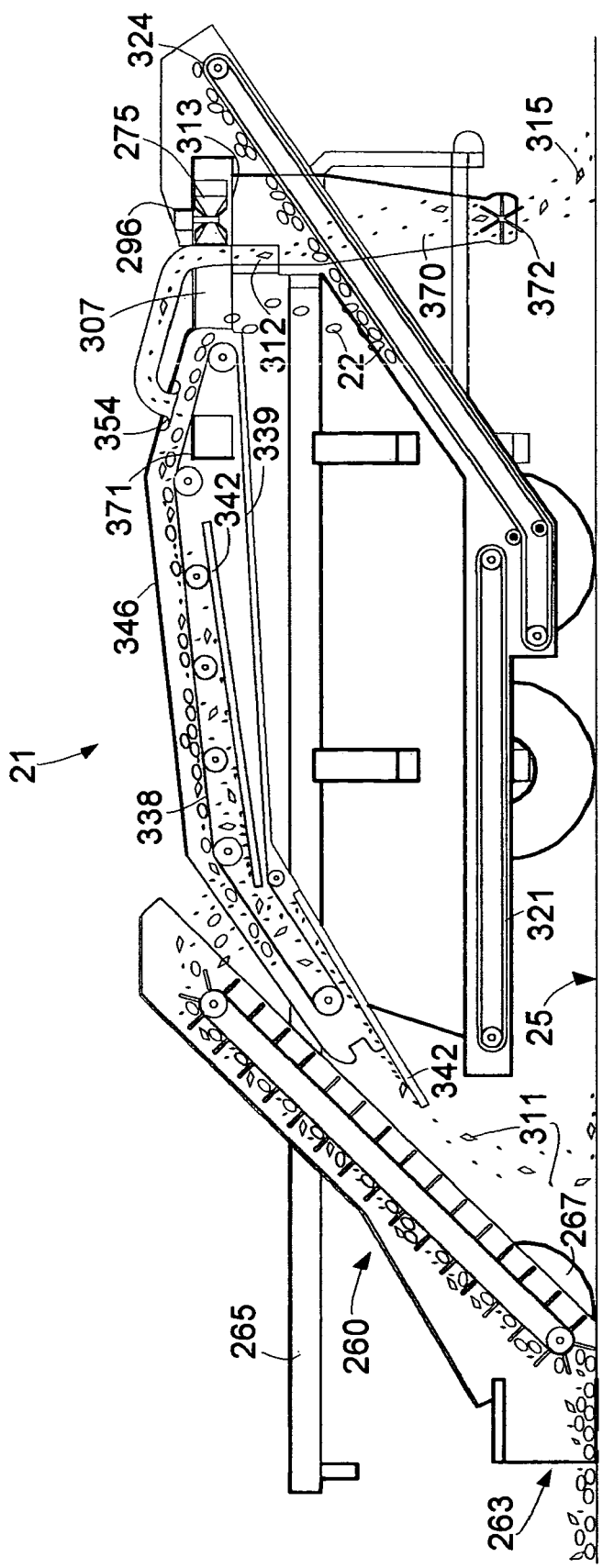
FIG. 34 is a sectioned side view of a harvester apparatus, according to an embodiment of the invention.

As shown in FIGS. 28 through 34, the harvester 21 configured according to the present invention can include a simplified air flow system and still incorporate aspects of the invention, as herein claimed. This alternative embodiment of the harvester is also a mobile apparatus, preferably towed behind a tractor 200, or some similar vehicle, as shown in FIG. 23. This alternative harvester also cleans and collects a windrow 155 of harvested produce, such as almonds 22, as shown in FIG. 34. This alternative harvester embodiment includes an windrow uptake section 260 that collects the almonds, which after initial processing, preferably by the conditioner 20 of the present invention, lay on the ground surface 25 in the form of the windrow, as discussed above. The windrow includes the harvested produce almonds and debris 29. This debris may have been deposited on the windrow after the windrow was formed, and must be separated from the almonds in this final windrow retrieval of the almond harvest.

The windrow uptake section 260 includes the windrow scoop 263 and the harvesting conveyor 268, with the windrow scoop in close proximity to the ground surface 25, as shown in FIG. 34. Preferably, the pair of windrow wheels 267 are employed to maintain the infeed scoop along the ground surface, to gather the scattered windrow, of almonds 22 and associated debris 29, into the harvesting conveyor. The harvesting conveyor lifts and then deposits the windrow onto the shaker conveyor 330 of the separation section 105, which is preferably similar to the separation section of the conditioner 20 when utilized in the harvester 21.

In this alternative preferred alternative embodiment of the harvester 21, again as shown in FIGS. 28 through 32 and 34, the separation section 105 of the harvester preferably includes the transport bin 320, and also preferably includes the shaker conveyor 330 as an alternative embodiment of the separation conveyor 108. The shaker conveyor receives the harvested material stream 270 from the harvesting conveyor 268. Although the conditioner 20 initially processed the scattered covering or carpet 28 of almonds 22, the windrow 155 deposited by the conditioner will still include debris 29, such as lighter dust and fines 169, which are particulate materials that must be removed efficiently, with a minimum of release outside to the atmosphere external to the separation section.

The shaker conveyer 330, mounted over the transport bin 320 of the harvester 21, as shown in FIG. 32, is enclosed in the shaker plenum 345. The shaker conveyor includes a shaker feed end 331 that slopes up to a shaker discharge end 333. The harvested material stream falls from the harvesting conveyor 268 onto the shaker conveyor at the shaker feed end. To aid in forming the shaker plenum about the shaker conveyor, the shaker conveyer is preferably capped by a shaker cover 346, as shown in FIGS. 32 and 34.

The shaker conveyor 330 also has both the material separation features of a conventional shaker table and material moving features of a conventional conveyor belt. The shaker conveyor includes a shaker belt 336. The shaker belt receives the harvested material stream 270 on a upper shaker belt portion 338, at the shaker feed end 331. The upper belt travels toward the shaker discharge end and then returns below as a lower shaker belt portion 339, back to the shaker feed end. The shaker belt is preferably a wide mesh that is sized to retain the almonds 22, but allow debris 29 to pass through it. The shaker conveyor also includes the debris tray 342, which directs any debris falling through the shaker belt, down the length of the shaker conveyor, discharging the debris at the shaker infeed end and onto the ground surface 25, as shown in FIG. 34. Preferably, for this embodiment of the present invention, a pair of debris trays can be utilized, one positioned between the shaker belts and a second debris tray positioned below the shaker belt, as shown in FIG. 32. The debris trays also serve to enclose the shaker plenum 345 from below, and so limits the size of the shaker plenum to maximize the velocity of the airstream 92 or air flow, and maximize the efficiency and effectiveness of the harvester pollution control device 310.

For the generation of the airstream 92 within this alternative harvester 21, the harvester fan 275 is employed, as shown in FIGS. 33 and 34. Preferably, the harvester fan is a standard, industrial quality, high volume blower. The optimum fan size and power would be readily selectable by a person skilled in fan and fan motor selection. The blower is preferably selected to generate sufficient air flow to dislodge the debris 29 from the shaker conveyor 330, and to maintain a reasonably air velocity within the shaker plenum 345. A most preferred harvester fan for this embodiment is a model "909," which is a 15.63 inch diameter industrial radial blade fan (paddle wheel), which generates approximately 3,000 CFM, at 10 inches w.g. of static, 2500 RPM and 12.19 BHP, as manufactured by Twin City Fan & Blower Co. of Minneapolis, Minn., U.S.A.

The harvester fan 275 or simply the "fan" is preferably positioned as shown in FIGS. 32 and 34. The fan includes a "supply side," referred to herein as the harvester fan supply 301, and a "suction side," referred to herein as the harvester fan return 302, as shown in FIG. 33. A shaker suction duct 351 connects to the shaker plenum 345 at a shaker suction outlet 354, which is preferably located in the shaker cover 346 of the shaker plenum 345, as shown in FIG. 32. The shaker suction duct routs from the shaker suction outlet to the suction side of the fan, at the harvester fan return. The shaker suction duct pulls a shaker suction airstream 353 from the separation plenum.

Preferably, the shaker conveyor 330 is substantially horizontal, with a slight upward tilt from the harvesting conveyor 268. In contrast, the harvesting conveyor has a significant tilt of approximately 30 to 45 degrees upward from horizontal. Therefore, the shaker flights 337 of the shaker conveyor need only to be in the range of approximately 1 to 3 inches in height, while the conveyor flights of the harvesting conveyor function best at approximately 4 to 6 inches in height. Like the conveyor belt 278 of the harvesting conveyor, the shaker belt 336 is preferably an open, metal mesh, sized to retain the almonds 22 on the shaker belt. Like the conveyor belt, the shaker belt is also sized and configured to provide strength, while allowing air to flow up through it, and allow debris 29, especially the harvester fallout material 311, to drop down through of it.

Similar in purpose to the uptake plenum 90, the separation plenum 120, and the conveyor plenum 282, described in reference to alternative embodiments herein, the shaker plenum 345 is much smaller than the plenums of prior nut uptake and collecting devices. The relatively small shaker plenum provides for the controlled and high velocity airstream 92 directed through the shaker plenum. With the shaker plenum having an approximately uniform cross-section along its entire length, the shaker suction airstream 353 is substantially homogenous and constant throughout the shaker plenum. A strong and consistent suction is attained throughout the shaker plenum with a minimum of total air flow. Again, this provides for an operational economy by reducing the requisite size and power of the harvester fan 275, and by reducing the air filtration necessary to remove the debris 29, from the separation section 105 of the harvester 21, especially the dusts and leaves that were removed from the processed stream 80 and entrained by the shaker suction airstream.

As shown in FIG. 34, the finer debris 29, especially dusts and fines 196, such as gravel and granules of dirt, drops through the shaker belt 336 of the shaker conveyor 330, creating the harvester fallout material 311. This particulate fraction of the debris, termed "fallout," relieves the need to pull additional suction, required to lift heavier, aerodynamic materials from the debris, which would be required if this heavier fallout material was retained on, instead of allowed to pass through the shaker belt. The harvester fallout material is deposited to the ground surface 25, as also shown in FIG. 34.

The shaker suction airstream 353 is pulled from the shaker plenum 345 and routed to the harvester fan return 302. Preferably, for this alternative embodiment of the harvester, the harvester fan return can be pulled through the harvester pollution control device 310. Most preferably, for the harvester 21 of the present invention, the harvester pollution control device is a cyclonic settling chamber 370, configured as shown in FIGS. 32 through 34. The cyclonic settling chamber includes the cyclone air inlet 312, the cyclone air outlet 313, and the harvester dropout 314. As an alternative, any pollution control device known to those skilled in the removal of particulate from the airstream 92 could be employed. The settling chamber in this alternative, is most preferably of a conventional, single chamber cyclonic configuration, for use at slightly negative pressures. The settling chamber could include baffles, multiple cyclones, filters or any such mechanisms for entraining, knocking out, or settling out debris 29, carried by the supply air stream into the conditioner pollution control device. The particulate debris that settles out of the conditioner pollution control device, exits from the dropout as a harvester dropout material 315.

The harvester pollution control device 310, which specifically the cyclonic settling chamber 370, receives the shaker suction airstream 353 and generates a cleaned shaker airstream 336. The cleaned shaker airstream exits the cyclone air outlet 313 and enters the harvester fan 275 in the harvester fan return 302. The harvester fan generates the shaker supply airstream 356, which is routed back to the shaker plenum 345, as detailed in FIG. 33. Instead of discharging this cleaned airstream to the atmosphere, as typical of prior devices, the cleaned shaker supply airstream is re-used by the harvester 21. Again, in a preferred embodiment of the harvester, two shaker supply air ducts 307 are utilized, one routed from each of two cyclonic settling chamber and harvester fan combinations, as shown in FIG. 32.

As shown in FIGS. 30, and 32 through 34, a cyclone rotary valve 372, is preferably employed to meter the flow of the harvester dropout material 315, from the harvester dropout 313 of the cyclonic settling chamber 370, as shown in FIG. 32. The cyclone rotary valve also acts as an airlock to prevent the introduction of air into the shaker plenum. The cyclone rotary valve is a standard mechanism, typically utilized for the controlled and substantially airtight withdrawal of a fine material from hoppers, cyclones or similar devices.

The shaker air supply duct 307 connects to the separation plenum 120 at the shaker inlet 371, which is preferably located on the sidewall of the shaker plenum, as shown in FIG. 32. The shaker suction duct 351 then pulls the shaker suction airstream 353 from the shaker plenum at the shaker suction outlet 354, preferably pulling the airstream 92 through the shaker belt 336 of the shaker conveyor 330, as shown in FIG. 32.

As also shown in FIG. 34, the almonds 22 are retained on the shaker belt 336 up to the shaker discharge end 333. The almonds are then deposited into the transport bin 320. The lower shaker belt portion 339 of the shaker belt serves to level the almonds within the transport bin, and push the almonds back toward the shaker feed end 331. Alternatively, the shaker belt may include conventional "chains" or links attached to the shaker belt that abut side-to-side in an echelon, to form the individual "flights," as also discussed herein.

The almonds 22 are preferably retained within the transport bin 320 of the harvester 21 until the transport bin is full and ready to be emptied by action of the loadout conveyor 321. As shown in FIG. 14, the almonds are preferably deposited into a bin cart 350, which follows the harvester and shuttles the almonds to a larger transport, or to a warehouse for storage or further processing.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The invention claimed is:

1. A method for cleaning and conditioning a harvested produce with a mobile apparatus, the method including the steps of:

a) collecting the harvested produce with an uptake section, the uptake section including an infeed scoop and an uptake conveyor, the infeed scoop maintained at a close proximity to a ground surface, the harvested produce lying on the ground surface in a scattered covering, the scattered covering including the harvested produce, and the scattered covering additionally including a debris;

b) gathering, the scattered covering into the uptake conveyor;

c) depositing the scattered covering onto a separation conveyor;

d) enclosing the separation conveyor within a plenum, the separation conveyor including a discharge end and a separation belt, and the separation belt including a mesh;

e) directing a suction airstream to flow through the separation belt;

f) removing the debris from the separation belt with the suction airstream;

g) retaining the harvested produce on the separation belt;

h) generating a supply airstream with a fan, the fan having a supply side and a suction side;

i) routing an air return duct to the suction side of the fan, the air return duct connected to the plenum at a plenum outlet;

j) pulling the suction airstream from the plenum with the air return duct;

k) routing an air supply duct from the supply side of the fan, the air supply duct connected to the plenum at a plenum inlet; and l) supplying the supply airstream to the plenum with the air supply duct.

2. The method of claim 1, including the additional step of:
m) gathering the debris removed from the separation belt into a dropout.

3. The method of claim 1, including the additional step of:
m) removing the debris settled out of the plenum.

4. The method of claim 1, including the additional step of:
m) discharging a cleaned product from the discharge end of the separation conveyor, the cleaned product including the harvested produce.

5. A method for cleaning and conditioning a harvested produce with a mobile apparatus, the method including the steps of:

a) collecting the harvested produce with an uptake section, the uptake section including an uptake conveyor, the harvested produce lying on a ground surface in a scattered covering, the scattered covering including the harvested produce, and the scattered covering additionally including a debris;

b) gathering, the scattered covering into the uptake conveyor;

c) depositing the scattered covering onto a separation conveyor;

d) enclosing the separation conveyor within a plenum, the separation conveyor including a discharge end and a separation belt, and the separation belt including a mesh;

e) directing an airstream to flow through the separation belt;

f) removing the debris from the separation belt with the airstream;

g) retaining the harvested produce on the separation belt;

h) generating the airstream with a fan, the fan having a supply side and a suction side;

i) routing an air return duct to the suction side of the fan, the air return duct connected to the plenum at a plenum outlet;

j) pulling the airstream from the plenum with the air return duct;

k) routing an air supply duct from the supply side of the fan, the air supply duct connected to the plenum at a plenum inlet; and l) recirculating the airstream to the plenum with the air supply duct.

6. The method of claim 5, including the additional step of:
m) gathering the debris removed from the separation belt into a dropout.

7. The method of claim 5, including the additional step of:
m) removing the debris settled out of the plenum.

8. The method of claim 5, including the additional step of:
m) discharging a cleaned product from the discharge end of the separation conveyor, the cleaned product including the harvested produce.

* * * * *